United States Patent
Hirose et al.

(10) Patent No.: US 9,209,919 B2
(45) Date of Patent: Dec. 8, 2015

(54) SYNCHRONIZATION CONTROL SYSTEM

(71) Applicant: Kabushiki Kaisha Toshiba, Tokyo (JP)

(72) Inventors: Akinori Hirose, Fuchu (JP); Akira Kawarada, Fuchu (JP); Kazuto Fukushima, Yokohama (JP); Hideaki Sugiura, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 112 days.

(21) Appl. No.: 14/057,115

(22) Filed: Oct. 18, 2013

(65) Prior Publication Data

US 2014/0050232 A1   Feb. 20, 2014

Related U.S. Application Data

(63) Continuation of application No. PCT/JP2012/057929, filed on Mar. 27, 2012.

(30) Foreign Application Priority Data

Apr. 19, 2011  (JP) .................................. 2011-092861

(51) Int. Cl.
*H04J 3/06*   (2006.01)

(52) U.S. Cl.
CPC ............. *H04J 3/0658* (2013.01); *H04J 3/0667* (2013.01); *H04J 3/0641* (2013.01)

(58) Field of Classification Search
CPC ...... H04J 3/0658; H04J 3/0667; H04J 3/0641
See application file for complete search history.

(56) References Cited

U.S. PATENT DOCUMENTS

| | | | |
|---|---|---|---|
| 8,842,113 B1* | 9/2014 | Holt et al. ..................... | 345/419 |
| 2005/0102328 A1* | 5/2005 | Ring et al. .................... | 707/201 |
| 2007/0130217 A1* | 6/2007 | Linyard et al. ................ | 707/201 |
| 2008/0126322 A1* | 5/2008 | Holt ................................. | 707/3 |
| 2009/0109953 A1* | 4/2009 | Tsang et al. .................. | 370/350 |
| 2011/0170527 A1* | 7/2011 | Yamamoto et al. ........... | 370/338 |
| 2012/0239620 A1* | 9/2012 | Masini et al. ................. | 707/634 |

FOREIGN PATENT DOCUMENTS

| | | |
|---|---|---|
| CN | 101232632 A | 7/2008 |
| CN | 101951312 A | 1/2011 |

(Continued)

OTHER PUBLICATIONS

International Search Report and Written Opinion issued for PCT/JP2012/057929, 11 pages, mailed May 15, 2012.

(Continued)

*Primary Examiner* — Brian D Nguyen
(74) *Attorney, Agent, or Firm* — Baker Botts L.L.P.

(57) ABSTRACT

According to an embodiment, the transmission processor of the master terminal includes a sending/receiving processor which sends a synchronization request demanding packet to a particular slave terminal and sends a synchronization reply packet when receiving a synchronization request packet from the slave terminal that has received the synchronization request demanding packet, and a synchronization controller which calculates a synchronization band from the time of the receipt of the data packet and from time information added to the received data packet to determine a synchronization state and which adjusts a correction amount in accordance with the synchronization state and sends an internal timing correction command to the timing generator.

12 Claims, 18 Drawing Sheets

(56) References Cited

FOREIGN PATENT DOCUMENTS

| | | |
|---|---|---|
| EP | 2023456 A1 | 2/2009 |
| JP | 07-015421 | 1/1995 |
| JP | 11-220481 | 8/1999 |
| JP | 2002-164903 A | 7/2002 |
| JP | 2005-229237 A | 8/2005 |
| JP | 2006-5646 A | 1/2006 |
| JP | 2006-050121 | 2/2006 |
| JP | 2009-182659 | 8/2009 |
| JP | 2010-041899 | 2/2010 |
| JP | 2011-40870 A | 2/2011 |
| JP | 2011-188644 | 9/2011 |

OTHER PUBLICATIONS

Lindsey, C.W. et al., "Network Synchronization Techniques: an Overview" NTZ Archiv, VDE Verlag (vol. 4, No. 7) Jul. 1982, 6 pages.

Extended European Search Report issued in related European Patent Application No. 12773953.0 mailed Aug. 4, 2014, 7 pages.

International Preliminary Report on Patentability in PCT/JP2012/057929, mailed Oct. 31, 2013, 9 pages.

Office Action issued in related Chinese Patent Application No. 201280013751.6, mailed Jul. 1, 2015, 20 pages (with translation.).

* cited by examiner

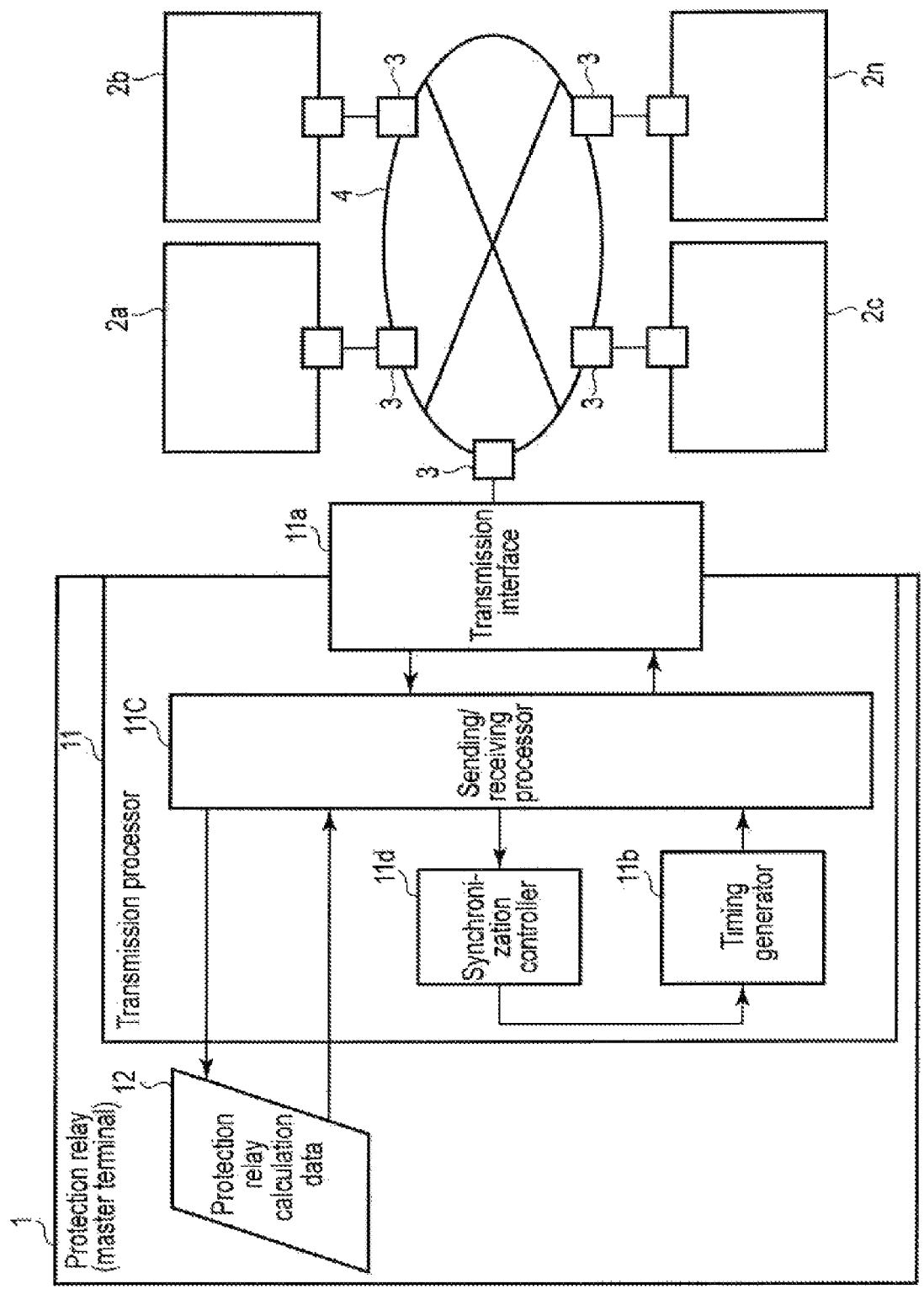
F I G. 1

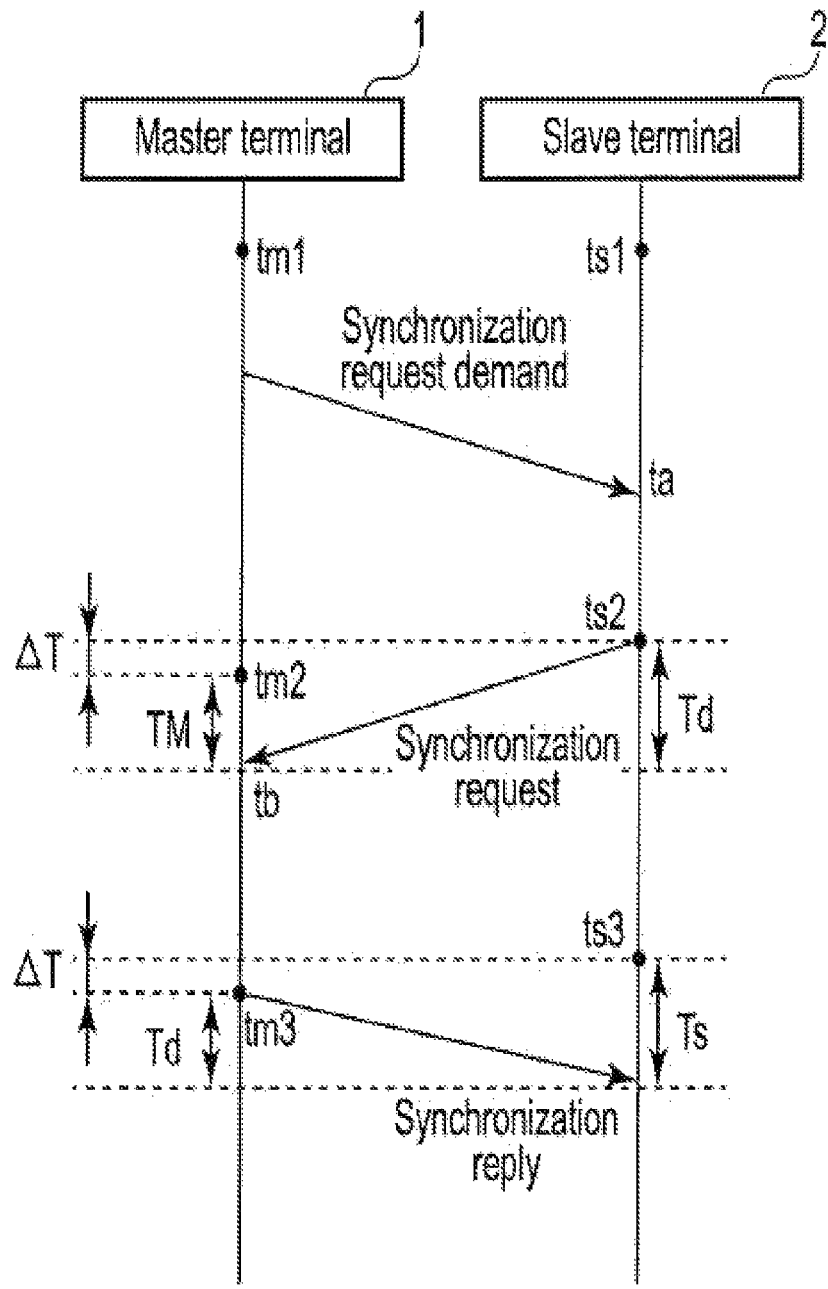
F I G. 2

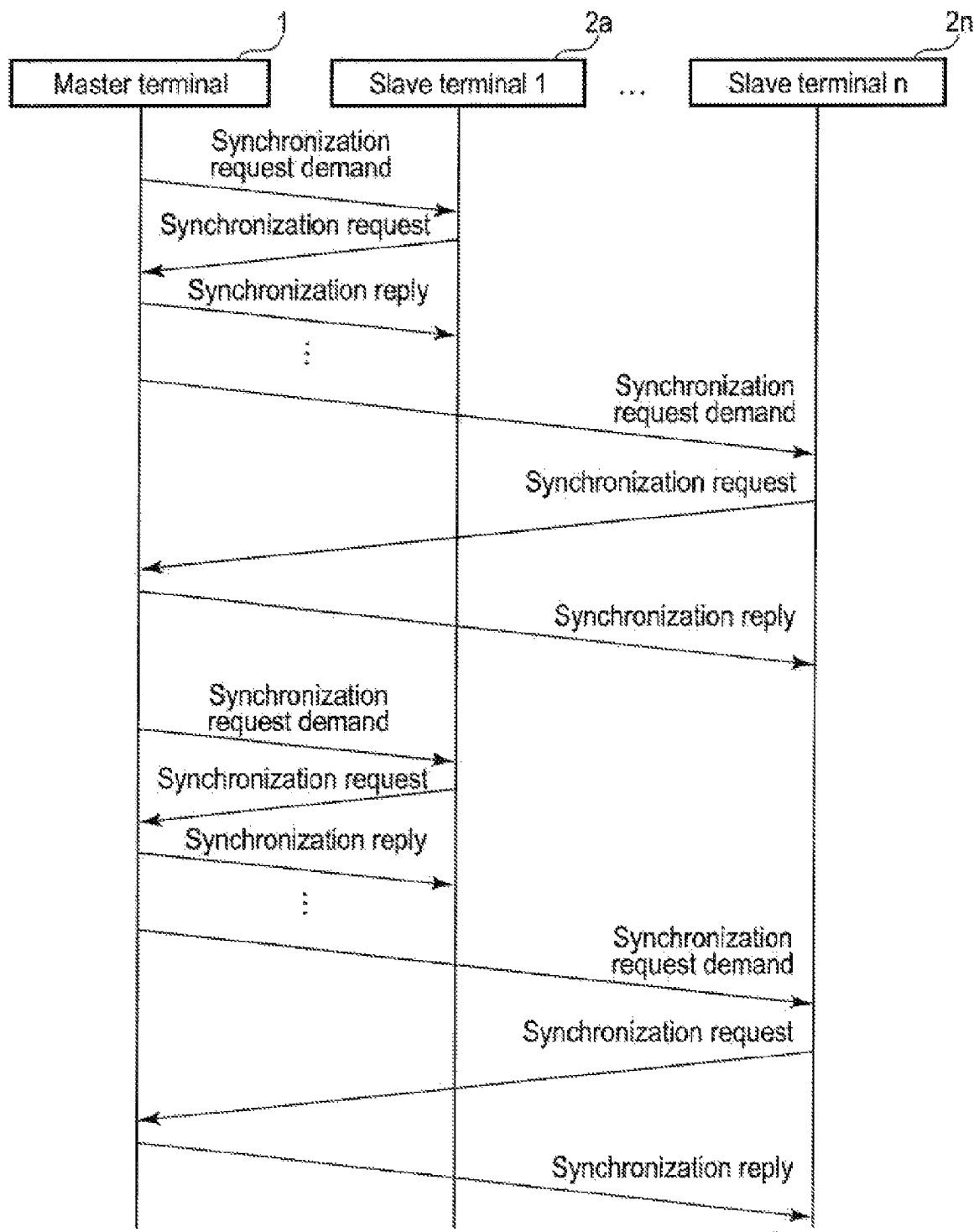
F I G. 3

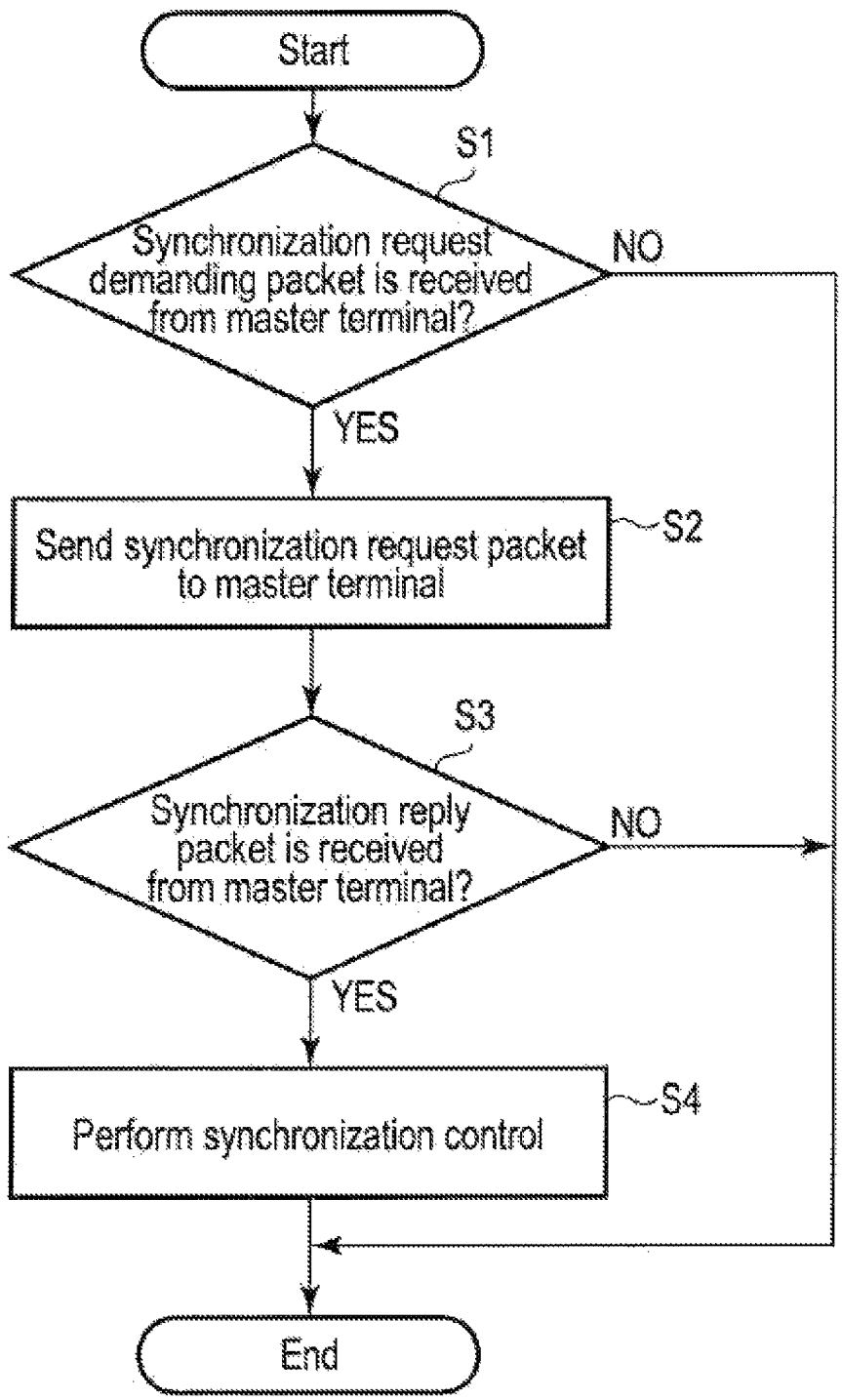
F I G. 5

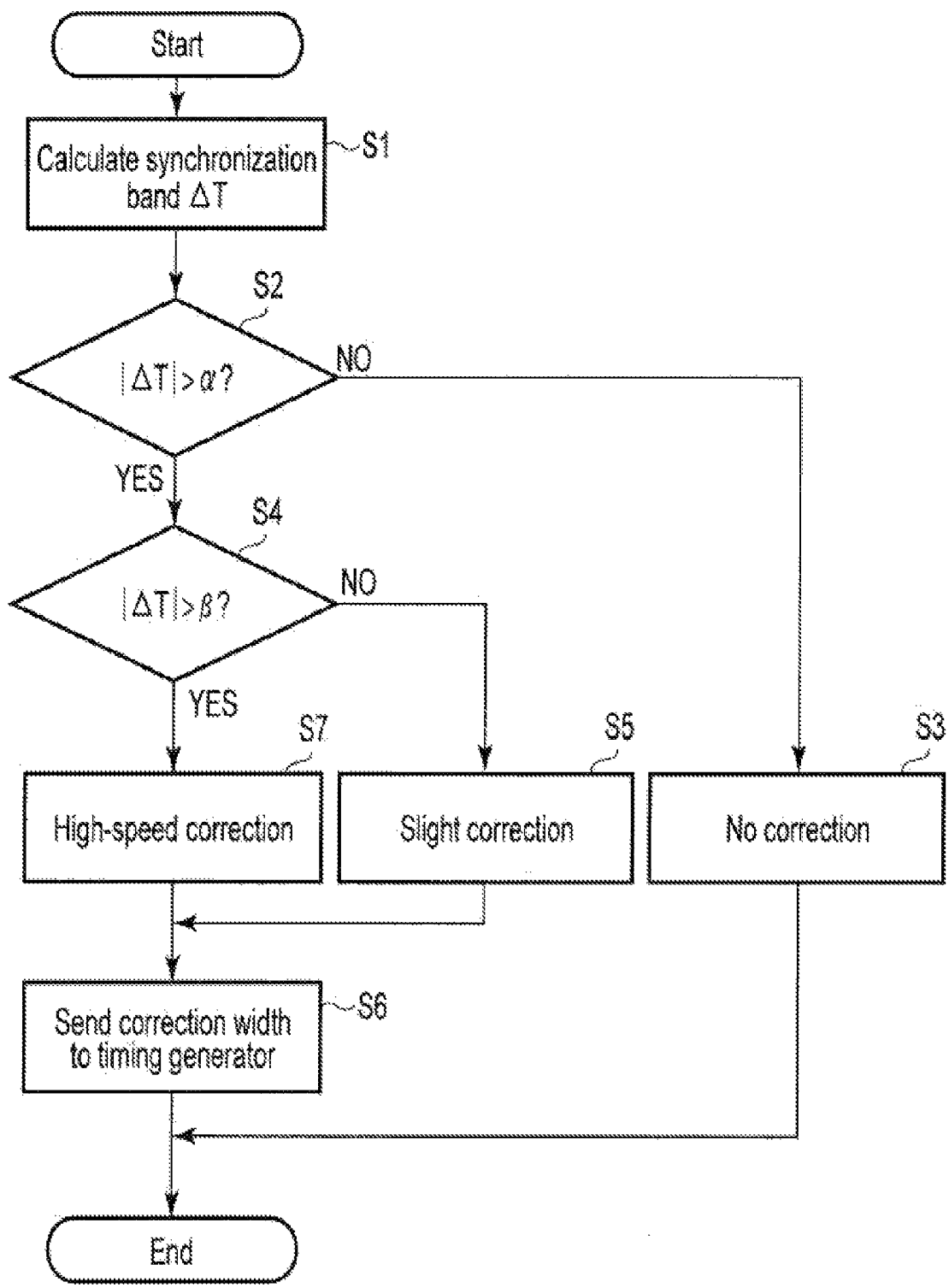
F I G. 6

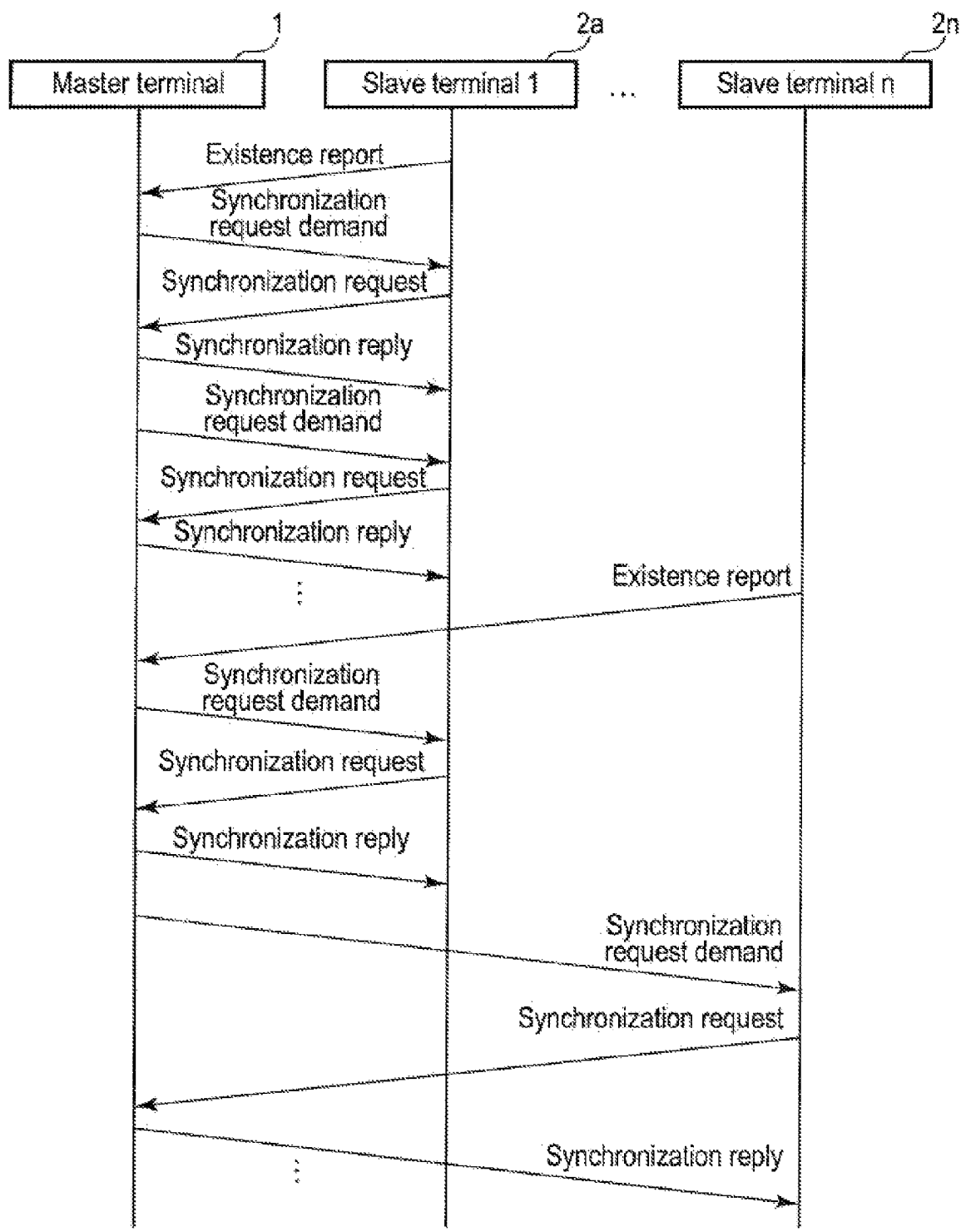
F I G. 7

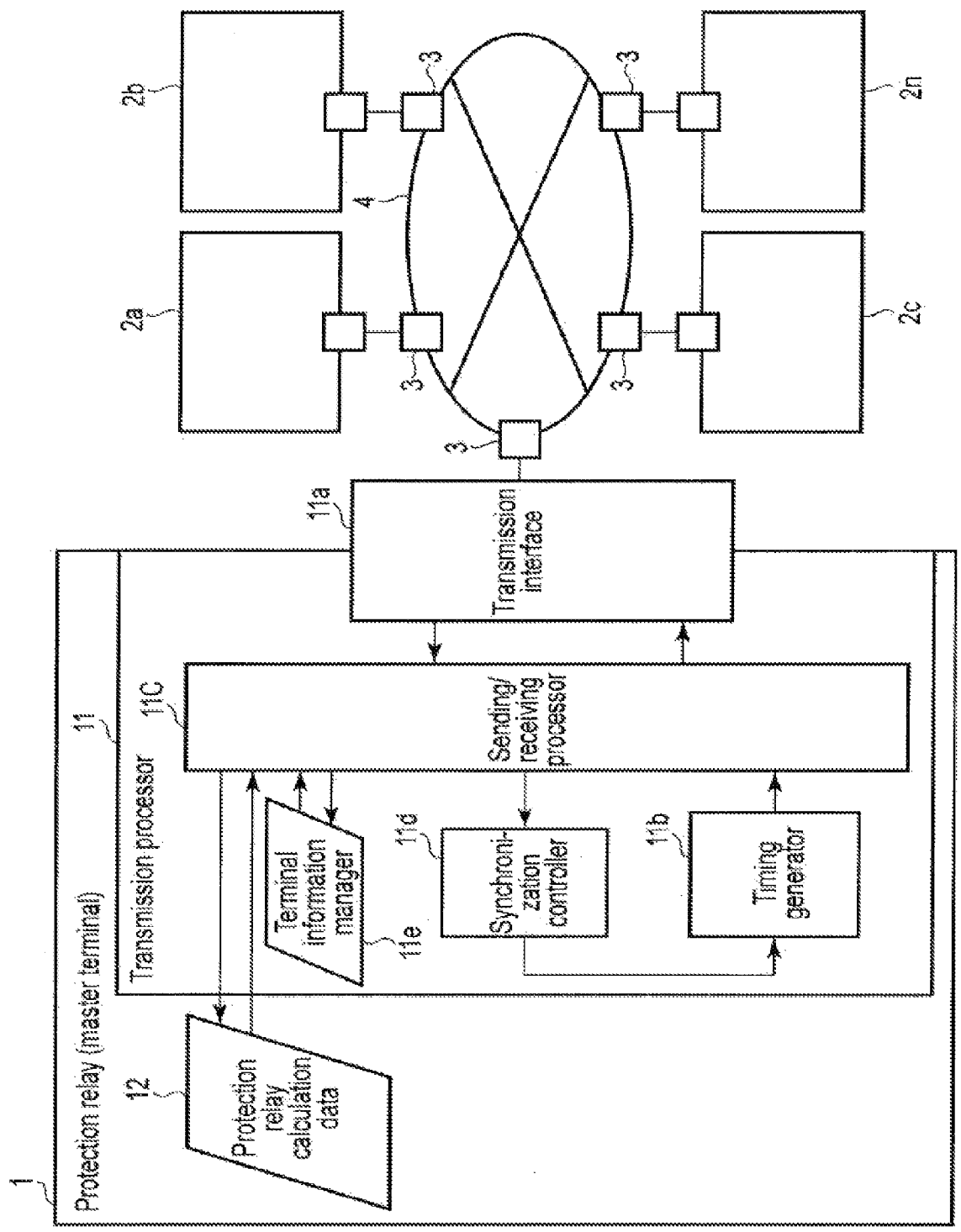
F I G. 8

| Terminal number | Existence number | Synchronization control in-progress | Synchronization reply permission | Time-out count | Address |
|---|---|---|---|---|---|
| 1 | YES | NO | NO | 2 | 11:22:33:44:55:66 |
| 2 | YES | YES | YES | 0 | 11:22:33:44:56:78 |
| 3 | NO | NO | NO | 0 | - |
| ... | | | | | |
| n-1 | YES | NO | NO | 1 | 11:22:33:44:cd:01 |
| n | YES | NO | NO | 0 | 11:22:33:44:cd:ef |

Terminal information manager

FIG. 9

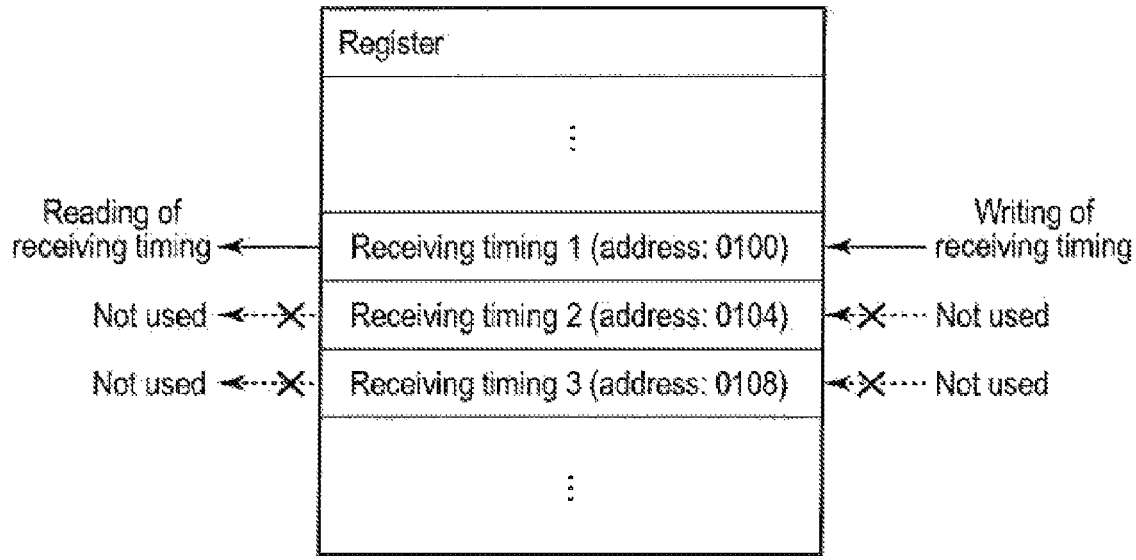
F I G. 10
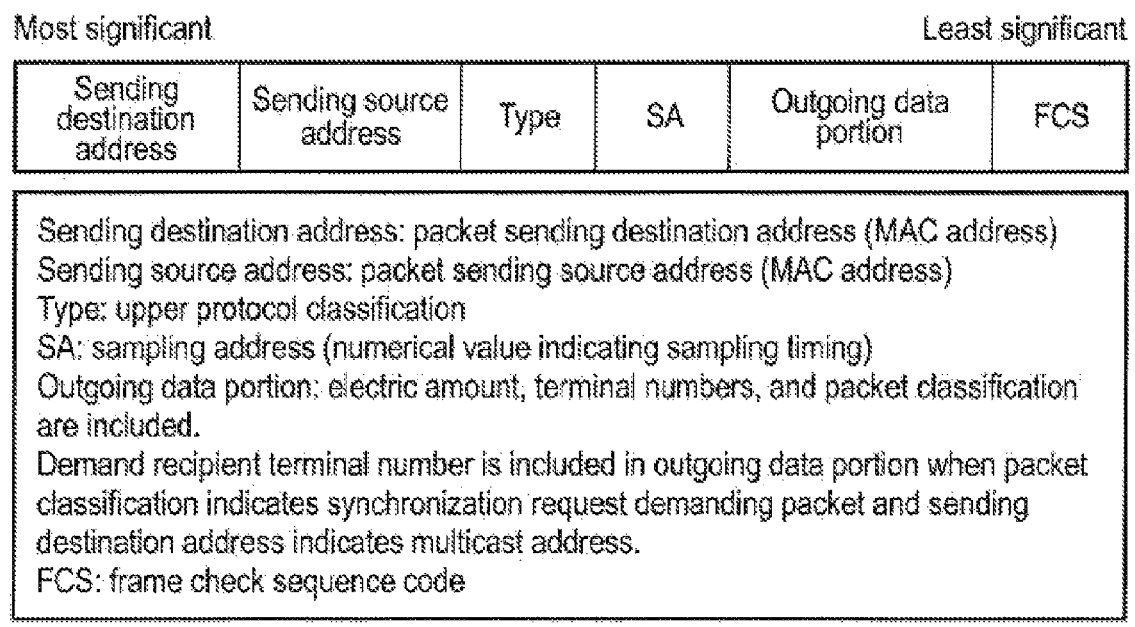
F I G. 11

| Terminal number | Existence number | Synchronization control in-progress | Synchronization reply permission | Time-out count | Address |
|---|---|---|---|---|---|
| 1 | YES | NO | NO | 0 | 11:22:33:44:55:66 |
| 2 | YES | YES | YES | 0 | 11:22:33:44:56:78 |
| 3 | YES | YES | YES | 0 | 11:22:33:44:57:12 |
| 4 | YES | YES | NO | 0 | 11:22:33:44:58:8a |
| 5 | YES | NO | NO | 0 | 11:22:33:44:59:ff |
| ... | | | | | |
| n-1 | YES | NO | NO | 0 | 11:22:33:44:cd:01 |
| n | YES | NO | NO | 0 | 11:22:33:44:cd:ef |

Terminal information manager

FIG. 13

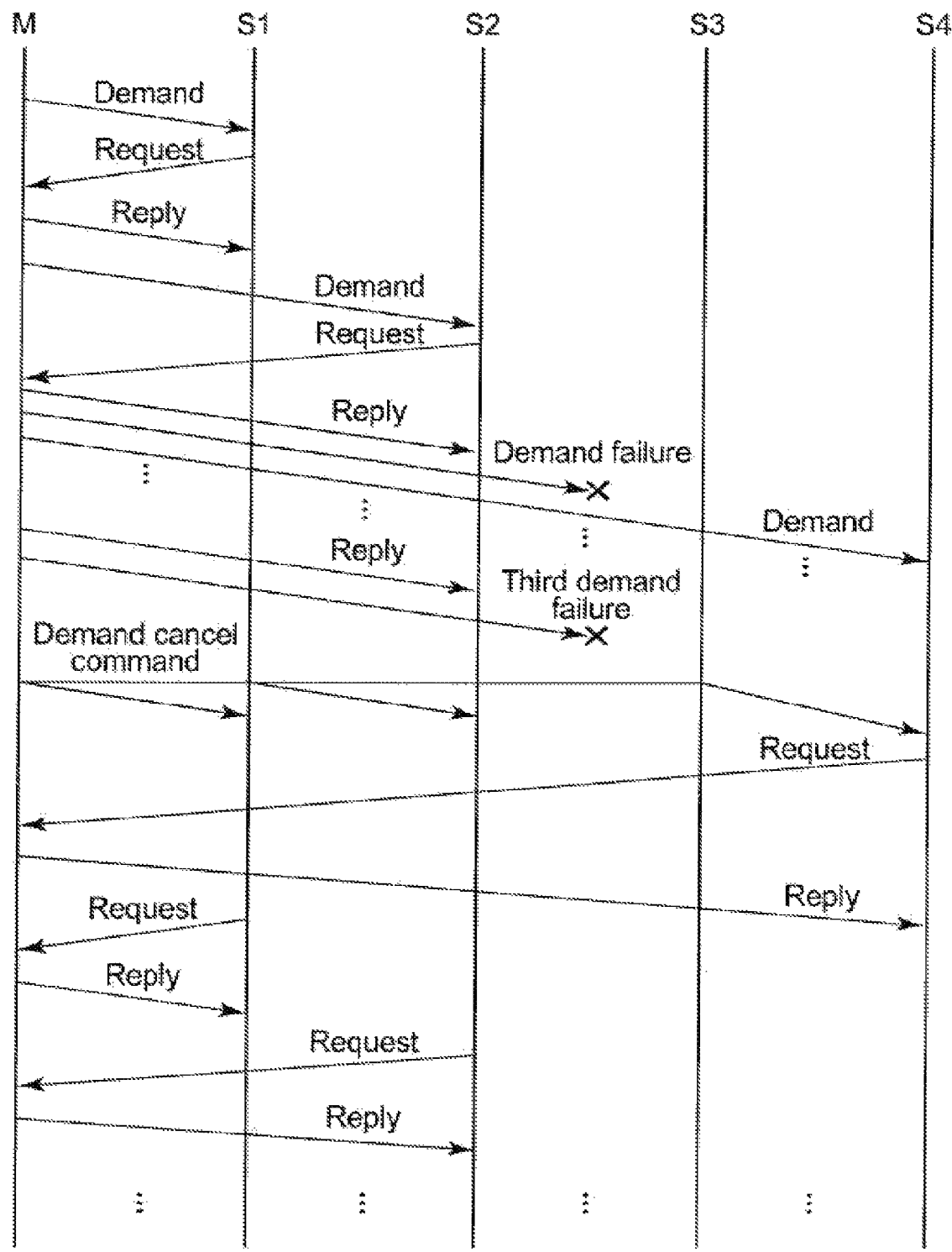
F I G. 14

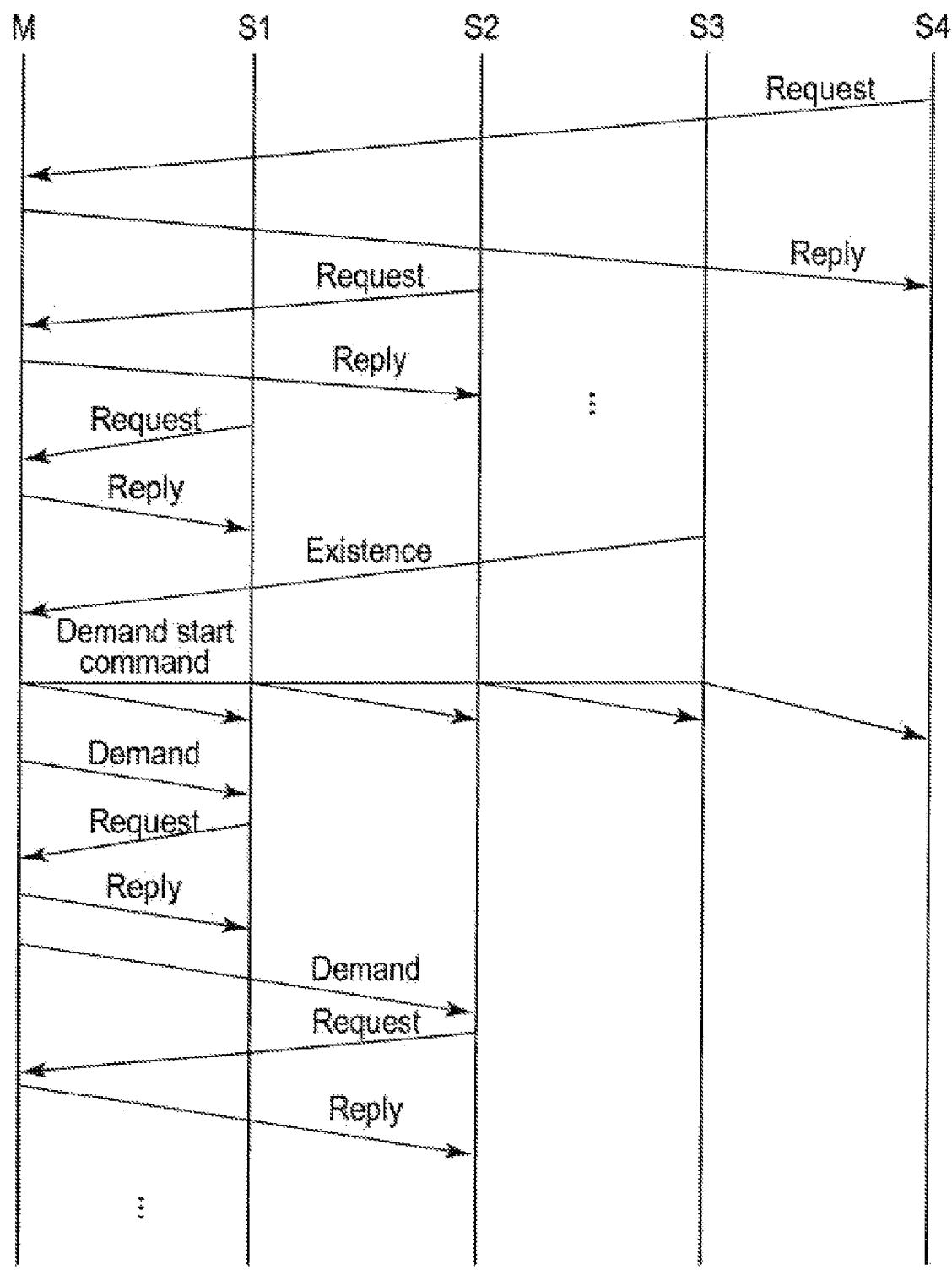
F I G. 15

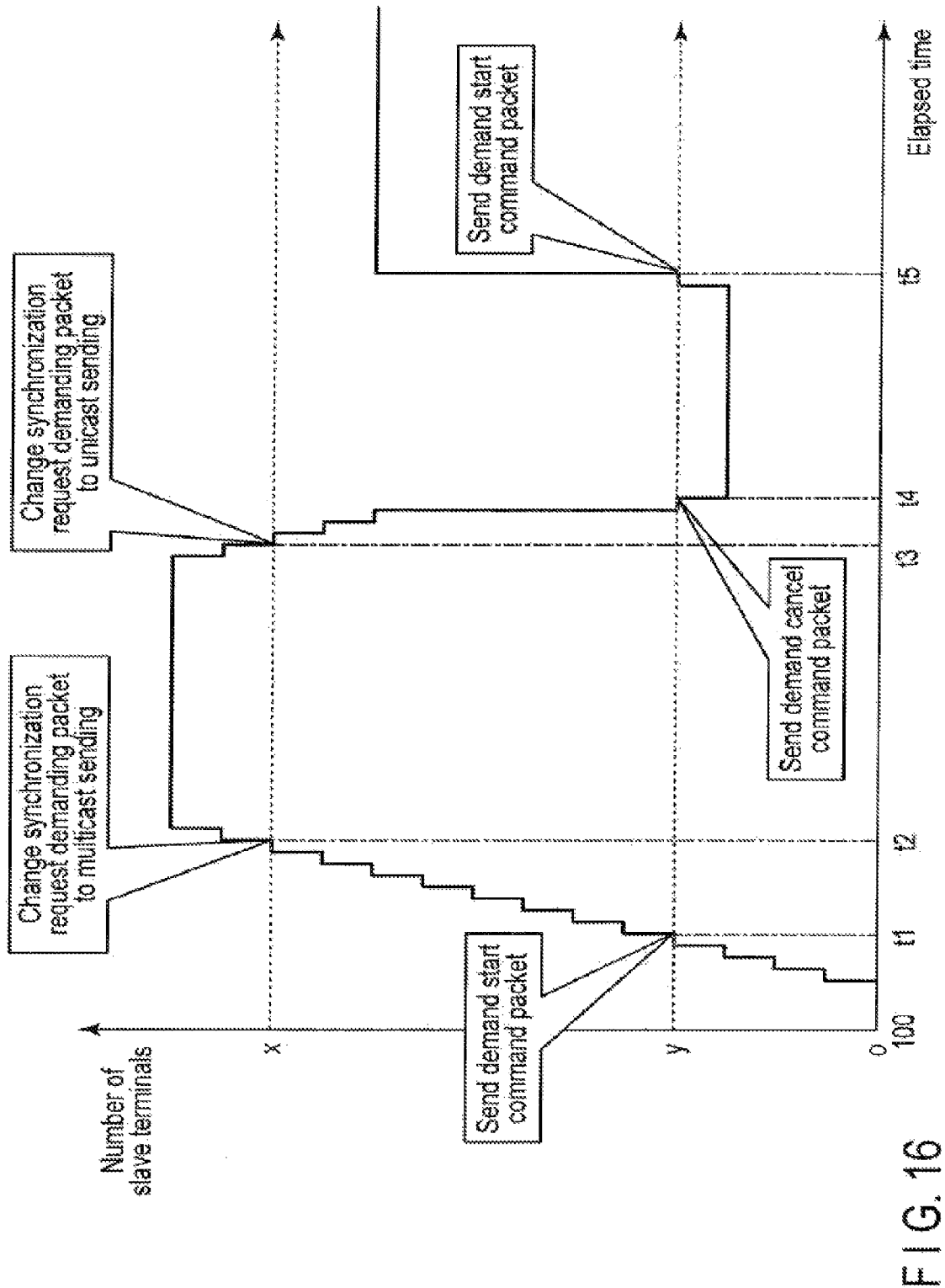
F I G. 16

| 11e-a | 11e-b | 11e-c | 11e-d | 11e-e | 11e-f |
|---|---|---|---|---|---|
| Terminal number | Existence number | Synchronization control in-progress | Synchronization reply permission | Time-out count | Address |
| 0 | YES | NO | NO | 0 | 11:22:33:44:55:11 |
| 1 | YES | NO | NO | 2 | 11:22:33:44:55:66 |
| 2 | YES | YES | YES | 0 | 11:22:33:44:56:78 |
| 3 | NO | NO | NO | 0 | |
| ... | | | | | |
| n-1 | YES | NO | NO | 1 | 11:22:33:44:cd:01 |
| n | YES | NO | NO | 0 | 11:22:33:44:cd:ef |

11e / Terminal information manager

F I G. 17

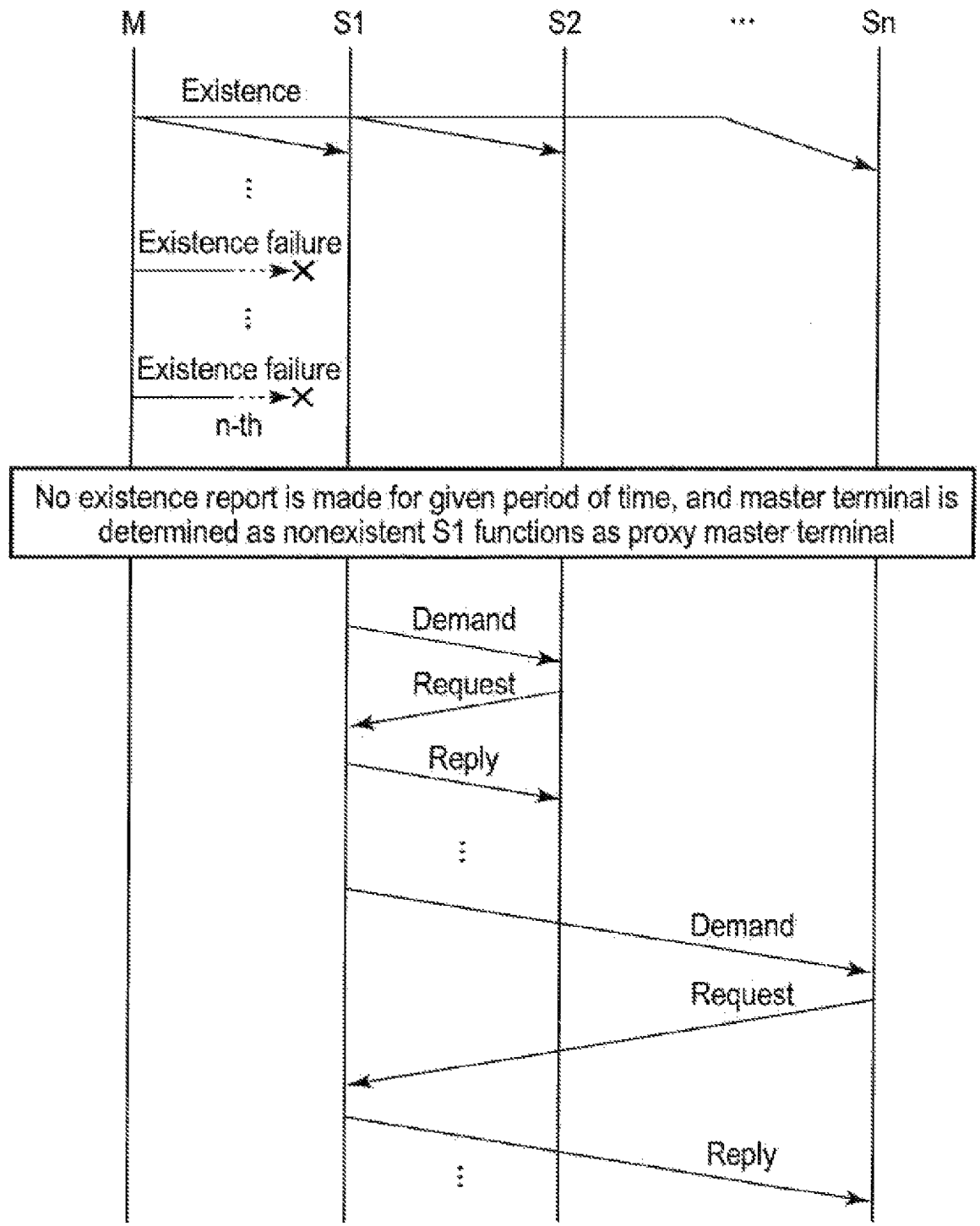
F I G. 18

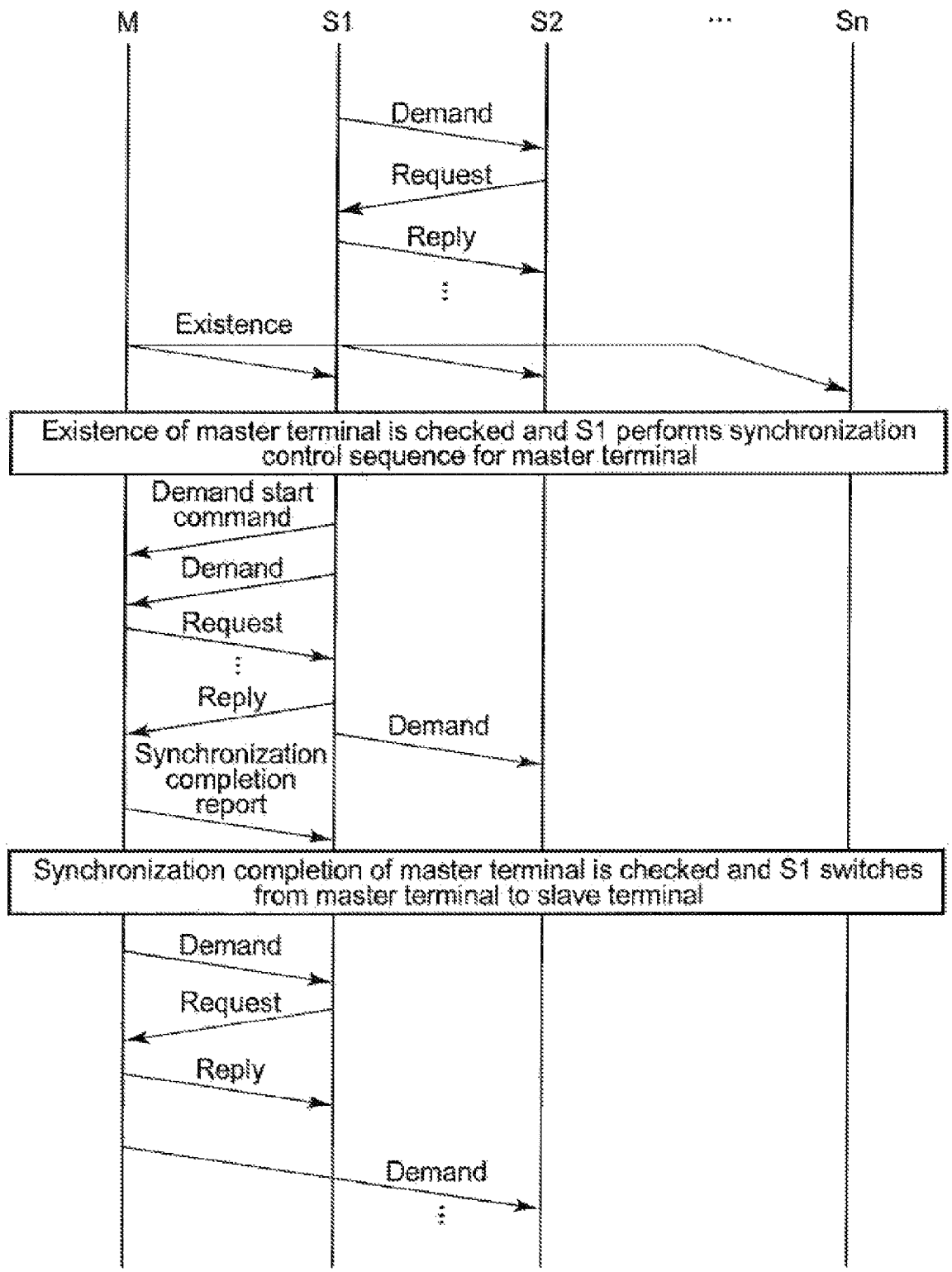
F I G. 19

SYNCHRONIZATION CONTROL SYSTEM

CROSS-REFERENCE TO RELATED APPLICATIONS

This application is a Continuation Application of PCT Application No. PCT/JP2012/057929, filed Mar. 27, 2012 and based upon and claiming the benefit of priority from Japanese Patent Application No. 2011-092861, filed Apr. 19, 2011, the entire contents of all of which are incorporated herein by reference.

FIELD

Embodiments described herein relate generally to a synchronization control system which synchronizes a plurality of slave terminals with a master terminal.

BACKGROUND

For example, a differential protection relay samples and digitizes, at the same time, a current input by a current transformer at each terminal of a power line. The digitized current data is then mutually transmitted via a communication system, and each terminal performs a differential protection calculation by using its current and current data received from the opposite terminal to make a fault determination. Here, simultaneous sampling of current data at the same time is called sampling synchronization. A master terminal and slave terminals are determined among the terminals of the power line, and data regarding the sampling timing of each terminal is sent as a timing flag. Each terminal measures a time interval between its sampling timing and a reception time of the timing flag from the partner terminal. If the time interval is sent to the slave terminal from the master terminal, the slave terminal finds a sampling synchronization band. The sampling timing is corrected by the corresponding time. As a result, the sampling timings of the master terminal and the slave terminal can be synchronized. Such a synchronization control system is used not only in the differential protection relay but also in many transmission systems.

There has been known a conventional synchronization control system which is improved in precision by the correction of the time synchronized by a transmission control latency required when a synchronization signal is sent to a device having a clock therein. It is also known to make the precision of time synchronization between a time setter device and a device targeted for time setting within an allowable band even if a transmission delay time changes upon each transmission. Moreover, it is known that in a network system which comprises a serial transmission path which connects one master terminal and a plurality of remote stations, an overhead of sampling data processing is absorbed so that collected data is rapidly processed.

BRIEF DESCRIPTION OF THE DRAWINGS

FIG. 1 is a configuration diagram of a synchronization control system according to Embodiment 1 of the present invention;

FIG. 2 is an explanatory diagram showing an example of a synchronization control sequence according to Embodiment 1 of the present invention;

FIG. 3 is an explanatory diagram of a synchronization control sequence in which a master terminal performs synchronization control with a plurality of slave terminals according to Embodiment 1 of the present invention;

FIG. 5 is a flowchart showing the contents of packet sending processing for the synchronization control of the slave terminal according to Embodiment 1 of the present invention;

FIG. 6 is a flowchart showing processing contents of a synchronization control algorithm in a synchronization controller 11d according to Embodiment 1 of the present invention;

FIG. 7 is an explanatory diagram of a synchronization control sequence in which the master terminal performs synchronization control with a plurality of slave terminals according to Embodiment 2 of the present invention;

FIG. 8 is a configuration diagram of a synchronization control system according to Embodiment 3 of the present invention;

FIG. 9 is an explanatory diagram of a table stored in a terminal information manager 11e according to Embodiment 3 of the present invention;

FIG. 10 is an explanatory diagram of a transmission interface according to Embodiment 4 of the present invention;

FIG. 11 is an explanatory diagram of a data packet in the case of multicast sending of a synchronization request demanding packet according to Embodiment 5 of the present invention;

FIG. 13 is an explanatory diagram of a table in the terminal information manager in the case of the multicast sending of the synchronization request demanding packet according to Embodiment 5 of the present invention;

FIG. 14 is an explanatory diagram of an example of a synchronization control sequence in which the master terminal sends a demand cancel command packet according to Embodiment 6 of the present invention;

FIG. 15 is an explanatory diagram of another example of the synchronization control sequence in which the master terminal sends the demand cancel command packet according to Embodiment 6 of the present invention;

FIG. 16 is an explanatory diagram of the transition of a synchronization control system according to Embodiment 6 of the present invention;

FIG. 17 is an explanatory diagram of a table in the terminal information manager in the case of multicast sending of a synchronization request demanding packet according to Embodiment 7 of the present invention;

FIG. 18 is an explanatory diagram of a synchronization control sequence in which the master terminal is disconnected from a network according to Embodiment 7 of the present invention; and FIG. 19 is an explanatory diagram of a synchronization control sequence in which the master terminal disconnected from the network is reconnected to the network according to Embodiment 7 of the present invention.

DETAILED DESCRIPTION

Figure 4:
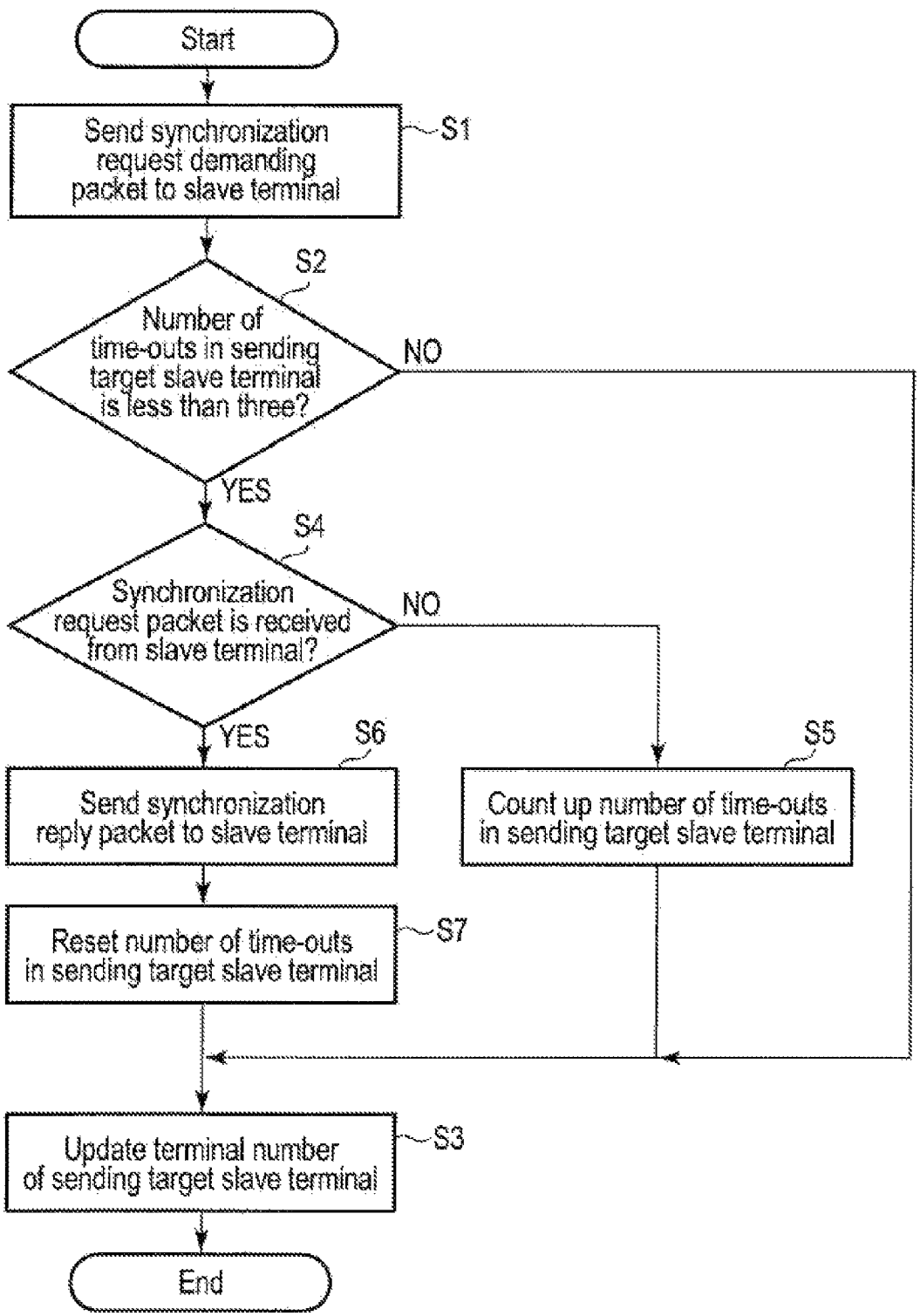
FIG. 4 is a flowchart showing the contents of packet sending processing for the synchronization control of the master terminal according to Embodiment 1 of the present invention.

Embodiments will be described with reference to the drawings.

In general, according to one embodiment, a synchronization control system respectively comprises transmission processors in a master terminal connected to a network and in a plurality of slave terminals and which synchronizes the slave terminals with the master terminal. The transmission processor of the master terminal comprises a transmission interface which holds a data packet to be sent or received and which acquires a receiving timing for synchronization control calculation when receiving a packet for synchronization control, a timing generator which generates a constant internal timing, a sending/receiving processor which sends a synchronization request demanding packet to a particular slave terminal and sends a synchronization reply packet when receiving a synchronization request packet from the slave terminal that has received the synchronization request demanding packet, and a synchronization controller which calculates a synchronization band from the time of the receipt of the data packet and from time information added to the received data packet to determine a synchronization state and which adjusts a correction amount in accordance with the synchronization state and sends an internal timing correction command to the timing generator.

Hereinafter, a synchronization control system according to embodiments of the present invention will be described. In the embodiments of the present invention, sampling synchronization control in a protection relay is described by way of example.

Embodiment 1

FIG. 1 is a configuration diagram of a synchronization control system according to Embodiment 1 of the present invention. In Embodiment 1 shown in FIG. 1, a master terminal 1 and slave terminals 2a to 2n are protection relays, and sampling synchronization control is performed between the master terminal 1 and the slave terminals 2a to 2n.

As shown in FIG. 1, the master terminal 1 has a transmission processor 11. The transmission processor 11 comprises a transmission interface 11a, a timing generator 11b, a sending/receiving processor 11c, and a synchronization controller 11d. The master terminal 1, which is a protection relay, has protection relay calculation data 12. The sending/receiving processor 11c of the master terminal 1 transfers the protection relay calculation data 12 to and from the slave terminals 2a to 2n. That is, each of the slave terminals 2a to 2n has the same function as the protection relay of the master terminal 1, and is connected to a high-speed network 4 via an intermediary device 3.

Data packets received by way of the network 4 and the intermediary device 3 are input to the master terminal 1 and the slave terminals 2a to 2n. The master terminal 1 and the slave terminals 2a to 2n output data packets formed by the sending/receiving processor 11c from information regarding an electric amount such as a current value and a voltage value included in the protection relay calculation data 12, information necessary for the monitoring and control of devices, and information necessary for synchronization control.

The transmission interface 11a of the transmission processor 11 sends or receives the data packet via the network 4 and the intermediary device 3, and acquires the timing of the receipt of the data packet. The transmission interface 11a has a system such as first-in first-out (FIFO) to hold data packets before being sent and data packets received from other terminals.

The timing generator 11b of the transmission processor 11 uses an internal clock element such as a quartz oscillator to generate its own internal timing signal in the master terminal 1 and the slave terminals 2a to 2n, and supplies the internal timing signal as a common processing timing in the transmission processor 11.

The sending/receiving processor 11c of the transmission processor 11 forms, into a data packet, information regarding an electric amount such as the current value and the voltage value included in the protection relay calculation data 12 and the information necessary for the synchronization control, and then passes the data packet to the transmission interface. The sending/receiving processor 11c controls a sampling timing on the basis of the processing timing given from the timing generator 11b, and analyzes the contents of the data packet received by the transmission interface 11a. Sending source terminal information and sending destination terminal information are included in the data packet, and a receiving end can identify the sending source terminal.

The master terminal 1 sends a synchronization request demanding packet to one of the slave terminals 2a to 2n. The slave terminals 2a to 2n analyze the received packet, and send synchronization request packets to the master terminal 1 if the received packet is the synchronization request demanding packet. After receiving the synchronization request packet, the master terminal 1 sends a synchronization reply packet to the slave terminal 2 to which the synchronization request demanding packet has been sent. The slave terminal 2 which has received the synchronization reply packet passes information included in the synchronization reply packet to the synchronization controller 11d, and in accordance with a calculation result in the synchronization controller 11d, performs synchronization control by increasing or decreasing the width of the internal timing signal generated by the timing generator 11b. The sending/receiving processor 11c performs processing to determine a time-out when there is no reply from the partner protection relay for a given period of time, and again performs a series of sequences of the synchronization control.

The synchronization controller 11d calculates a synchronization band by using the information obtained by the sending/receiving processor 11c as a result of analyzing the synchronization reply packet received by the slave terminals 2a to 2n. The synchronization controller 11d determines a synchronization state from the calculated synchronization band, and on the basis of the determination result, passes the correction width of the internal timing signal to the timing generator 11b.

FIG. 2 is an explanatory diagram showing an example of a synchronization control sequence according to Embodiment 1 of the present invention. In the example shown in FIG. 2, sampling timings are respectively given to the master terminal 1 and the slave terminals 2a to 2n which are protection relays by the timing generators 11b therein.

In FIG. 2, black circles indicate the sampling timings in the master terminal 1 and the slave terminal 2. That is, the sampling timings of the master terminal 1 are times tm1, tm2, tm3, . . . , and the sampling timings of the slave terminal 2 are times ts1, ts2, ts3, . . . .

First, the master terminal 1 sends a synchronization request demanding packet at the given sampling timing tm1. The slave terminal 2 receives the synchronization request demanding packet at a time ta, and then sends a synchronization request packet at the sampling timing ts2 (black circle) closest to the receiving time. After a given transmission delay Td, the master terminal 1 receives the synchronization request packet at a time tb.

At the same time, in the master terminal 1, the transmission interface 11a acquires a time difference TM between the packet receiving time tb and the sampling timing tm2. In addition, there is a synchronization band ΔT between the sampling timings of both the terminals.

The sending/receiving processor 11c then generates a synchronization reply packet including, as information, the time difference TM between the packet receiving time tb and the sampling timing tm2 of the master terminal 1, and sends the synchronization reply packet to the slave terminal 2. The slave terminal 2 receives the synchronization reply packet after the transmission delay Td. The time difference between a packet receiving time tc and the sampling timing tm3 at this point is TS. The slave terminal 2 calculates the synchronization band ΔT from the time difference TS and from the time difference TM included in the synchronization reply packet. If the transmission delay Td is constant between the master terminal and the slave terminal, Td=ΔT+TM. The time difference TS is TS=Td+ΔT. Consequently, the synchronization band ΔT is represented by Equation (1). The slave terminals 2a to 2n use this synchronization band ΔT to determine the synchronization state.

$$\Delta T = (TS - TM)/2 \quad (1)$$

Next, a sequence for a synchronization control sequence in which the master terminal 1 performs synchronization control with the slave terminals 2a to 2n is described. FIG. 3 is an explanatory diagram of a synchronization control sequence in which the master terminal performs synchronization control with a plurality of slave terminals according to Embodiment 1 of the present invention.

In the example shown in FIG. 3, terminal numbers starting with 1 are respectively added to the slave terminals 2a to 2n (terminal numbers 1 to n). The master terminal 1 sequentially sends synchronization request demanding packets to the slave terminals 2a to 2n or sends synchronization request demanding packets to the slave terminal 2a having the first terminal number 1 to the slave terminal 2n having the last terminal number n. After one round, the master terminal 1 returns to the slave terminal 2a.

In the example shown in FIG. 3, the synchronization request demanding packet is not sent to the next sending destination until the synchronization control sequence shown in FIG. 2 is completed for one slave terminal 2. That is, in the example shown in FIG. 3, the synchronization control sequence shown in FIG. 2 is sequentially performed for each of the slave terminals 2.

Next, the operation at the master terminal 1 in the synchronization control sequence is described. FIG. 4 is a flowchart showing the contents of packet sending processing for the synchronization control of the master terminal 1 according to Embodiment 1 of the present invention. In FIG. 4, the terminal number of the slave terminal 2 targeted for the synchronization control is m (m≤n). The master terminal 1 sends the synchronization request demanding packet to the slave terminal m by a given sampling timing (S1). Here, it is possible that synchronization control processing for the slave terminal targeted for packet sending has been timed out before because of, for example, a network failure. In the example shown in FIG. 4, it is determined that the slave terminal 2m targeted for packet sending does not exist when the number of time-outs is three or more. That is, the master terminal 1 determines whether the number of time-outs in the slave terminal 2m is three or more (S2), and when the number of time-outs is three or more, the master terminal 1 updates the number of the slave terminal to send the synchronization request demanding packet to (S3).

When the number of time-outs is less than three, it is then determined whether a synchronization request packet is received from the slave terminal 2m within a given period of time (S4). When no synchronization request packet is received within the given period of time, the number of time-outs in the slave terminal targeted for packet sending is counted up (S5), and the number of the slave terminal to send the synchronization request demanding packet to is updated (S3).

When a synchronization request packet is received, a synchronization reply packet is sent to the slave terminal 2m (S6). When the slave terminal has been timed out before, the number of time-outs in the slave terminal targeted for packet sending is reset (S7). The number of the slave terminal to send the synchronization request demanding packet to is then updated (S3).

Next, the operation at the slave terminal in the synchronization control sequence is described. FIG. 5 is a flowchart showing the contents of packet sending processing for the synchronization control of the slave terminal according to Embodiment 1 of the present invention. Each of the slave terminals 2a to 2n determines whether a synchronization request demanding packet is received from the master terminal 1 (S1). When the synchronization request demanding packet is received, each slave terminal sends a synchronization request packet to the master terminal 1 (S2). When no synchronization request demanding packet is received, each slave terminal performs nothing and finishes the operation. After the synchronization request packet is received, each slave terminal determines whether a synchronization reply packet is received from the master terminal 1 (S3). When the synchronization reply packet is received from the master terminal 1, the synchronization controller 11d performs synchronization control (S4). When no synchronization reply packet is received, each slave terminal also finishes the operation.

Next, a synchronization control algorithm in the synchronization controller 11d according to Embodiment 1 of the present invention is described. FIG. 6 is a flowchart showing processing contents of the synchronization control algorithm in the synchronization controller 11d according to Embodiment 1 of the present invention.

The synchronization controller 11d calculates the synchronization band ΔT (S1), and determines whether a margin |ΔT| of the synchronization band ΔT is more than a given threshold α (threshold for implementation of a small correction) (S2). When the margin |ΔT| of the synchronization band ΔT is not more than the given threshold α, the synchronization controller 11d determines that sufficient synchronization can be performed, and makes no correction (S3).

On the other hand, when the margin |ΔT| of the synchronization band ΔT is more than the given threshold α, the synchronization controller 11d then determines whether the margin |ΔT| is more than a given threshold β (threshold for implementation of a high-speed correction) (S4). When the margin |ΔT| of the synchronization band ΔT is not more than the threshold β, a slight correction is made (S5), and a correction width is sent to the timing generator 11b (S6). When it is determined in step S4 that the margin |ΔT| is more than the threshold β, the margin |ΔT| is out of the allowable range of the synchronization state. Therefore, the synchronization controller 11d determines that the synchronization band is targeted for a high-speed correction, and makes the high-speed correction (S7), and then sends a correction width to the timing generator 11b (S6). In this way, the correction width of the internal timing signal is determined, and the correction width is sent to the timing generator 11b.

According to the synchronization control system in Embodiment 1 of the present invention, in the protection relays which mutually transmit data packets such as electric amount data via a communication system, the master terminal 1 sends the synchronization request demanding packet and thereby leads the synchronization control. The master terminal 1 sequentially poles the slave terminals 2a to 2n by the synchronization request demanding packets.

In contrast, in a conventional synchronization control system, the slave terminals 2a to 2n lead the synchronization control. As a result, the sending timing of the synchronization request packet from each of the slave terminals 2a to 2n is synchronized. When this method is used and a high-speed network such as a Gigabit Ethernet (registered trademark) is used, the receiving of the synchronization request packet from each of the slave terminals 2a to 2n is synchronized in the intermediary device 3. An output delay is caused by buffering in the intermediary device 3, for example, a switching hub, and return-delay of packets is caused by the master terminal 1. Thus, the concern has been that synchronization precision deteriorates with an increased number of protection relays.

As described above, in the synchronization control system according to Embodiment 1 of the present invention, the master terminal 1 sends the synchronization request demanding packet and thereby leads the synchronization control. The master terminal 1 performs a series of synchronization control sequences for each of the slave terminals 2a to 2n. The master terminal 1 receives only one synchronization request packet from the slave terminals 2a to 2n in one synchronization control sequence. An output delay resulting from buffering in the intermediary device 3 and the packet return-delay caused by the master terminal 1 can be avoided. As a result, a high synchronization precision can be obtained in the synchronization control with a plurality of terminals.

Embodiment 2

Embodiment 2 of the present invention is described next. FIG. 7 is an explanatory diagram of a synchronization control sequence in which the master terminal performs synchronization control with a plurality of slave terminals according to Embodiment 2 of the present invention. In Embodiment 2, in contrast with Embodiment 1 shown in FIG. 3, an existence report packet is sent to the master terminal 1 in a long period to report that the transmission processor 11 of each of the slave terminals 2a to 2n is connected to the network. Embodiment 2 describes an example of processing immediately after power is applied to each of the slave terminals 2a to 2n when sampling synchronization control is performed between the master terminal 1 and each of the slave terminals 2a to 2n.

As shown in FIG. 7, in Embodiment 2, in addition to the configuration shown in FIG. 3, each of the slave terminals 2a to 2n sends the existence report packet in a long period to report that each slave terminal is connected to the high-speed network 4 via the intermediary device 3. The sending/receiving processor 11c of each of the slave terminals 2a to 2n sends the existence report packet to the master terminal 1 in a long period immediately after the application of power. The existence report packet includes the number of the sending source slave terminal as information, so that the sending destination terminal can identify the sending source. The master terminal 1 which has received the existence report packet only sends a synchronization request demanding packet to the slave terminal 2 to which the existence report has been sent.

In the example shown in FIG. 7, the synchronization control sequence is continued for the slave terminal 2a alone for a certain time after the receipt of the existence report packet from the slave terminal 2a. Further, the existence report is received from the slave terminal 2n, and a synchronization control sequence is then also performed for the slave terminal 2n. After this, synchronization control sequences are sequentially performed only for the slave terminals 2 which have sent the existence reports.

As described above, in the synchronization control system according to Embodiment 2 of the present invention, the slave terminal 2 sends the existence report packet to the master terminal 1 in a long period to report that the slave terminal 2 is connected to the network. The master terminal 1 which has received the existence report packet sequentially performs a synchronization control sequence only for each of the slave terminals 2 which have sent the existence reports. Thus, the master terminal 1 does not need to perform processing to send the synchronization request demanding packets to the slave terminals 2 which are not connected to the network or which are not powered on. As a result, the synchronization control sequences can be minimized.

In consequence, it is possible to not only perform the synchronization control led by the master terminal 1 described in Embodiment 1 but also perform the synchronization control for the slave terminals 2 which have been ascertained to exist. This can minimize the packets exchanged between the terminals, and improve the efficiency of the synchronization control.

Embodiment 3

Now, Embodiment 3 of the present invention is described. FIG. 8 is a configuration diagram of a synchronization control system according to Embodiment 3 of the present invention. In Embodiment 3, the transmission processor 11 is additionally provided with a terminal information manager 11e storing a table for managing information regarding the master terminal 1 and the state of synchronization control. The same reference signs are given to the same components as the components in Embodiment 1 shown in FIG. 1, and repeated explanations are omitted.

As shown in FIG. 8, in Embodiment 3, the transmission processor 11 is additionally provided with the terminal information manager 11e. Information regarding each of the slave terminals 2a to 2n is saved in the terminal information manager 11e on the basis of information regarding the received packet analyzed by the sending/receiving processor 11c. When generating a packet for the synchronization control, the sending/receiving processor 11c calls the information regarding the slave terminals 2a to 2n from the terminal information manager 11e.

FIG. 9 is an explanatory diagram of a table stored in the terminal information manager 11e to manage the information regarding the master terminal 1 and the state of synchronization control. As shown in FIG. 9, the terminal information manager 11e stores a table comprising a slave terminal number column 11e-a serving as a key value of information, an existence state column 11e-b of each slave terminal, a synchronization control in-progress column 11e-c indicating the slave terminal currently under a synchronization control sequence, a synchronization reply permission column 11e-d indicating whether a synchronization reply packet can be sent to the slave terminal currently under a synchronization control sequence, a time-out count column 11e-e, and an address column 11e-f for managing the addresses of the slave terminals.

In FIG. 9, the format for saving in the address column 11e-f is a media access control (MAC). The maximum number of columns in the table is n, which is the highest terminal number. The initial conditions of the existence state column 11e-b, the synchronization control in-progress column 11e-c, and the synchronization reply permission column 11e-d are all "No". The initial conditions of the time-out count column 11e-e are all "No". Space characters are stored as all the initial conditions of the address column 11e-f.

In the example shown in FIG. 9, when the received data packet analyzed by the sending/receiving processor 11c is the existence report packet from the slave terminal 2, the contents in a cell corresponding to the terminal number 2 in the existence state column 11e-b are changed from "No" to "Yes", and the existence state of the slave terminal 2 is stored. Existence report packets are also received from the terminal numbers 1, n−1, and n, and the contents in a cell corresponding to each terminal number are changed from "No" to "Yes".

In the example shown in FIG. 9, the synchronization request demanding packet is sent, and the slave terminal under synchronization control is the slave terminal 2. In order to store this condition, the cell of the synchronization control in-progress column 11e-c is set to "Yes". The example shown in FIG. 9 shows a condition immediately after the master terminal 1 has received the synchronization request packet from the slave terminal 2, and the master terminal 1 is ready to send the synchronization reply packet to the slave terminal 2. In order to store this condition, the corresponding cell of the synchronization reply permission column 11e-d is set to "Yes". The synchronization control sequence for the slave terminal 2 is completed after the master terminal 1 has sent the synchronization reply packet to the slave terminal 2. Therefore, the corresponding cells of the synchronization control in-progress column 11e-c and the synchronization reply permission column 11e-d are returned to "No" from "Yes".

In the example shown in FIG. 9, no synchronization request packets are received from the slave terminal 1 cumulatively twice for a given period of time, and no synchronization request packet is received from the slave terminal n−1 once for a given period of time. The sending/receiving processor 11c counts up the number of time-outs on the basis of the processing procedure in FIG. 4, and passes a time-out count value of each slave terminal to the terminal information manager 11e. The sending/receiving processor 11c stores "2" in the corresponding cell of the terminal number 1 in the address column 11e-f, and stores "1" in the corresponding cell of the terminal number n−1.

When the master terminal 1 receives the existence report packet, the sending/receiving processor 11c analyzes this packet and obtains the address of the sending source slave terminal 2. In the example shown in FIG. 9, the address of the slave terminal 2a (terminal number 1) is "11:22:33:44:55:66", the address of the slave terminal 2b (terminal number 2) is "11:22:33:44:56:78", the address of the slave terminal n1 is "11:22:33:44:cd:01", and the address of the slave terminal n is "11:22:33:44:cd:ef". After analyzing the existence report packet, the sending/receiving processor 11c passes the addresses to the terminal information manager 11e, and stores the addresses in the corresponding cell of the address column 11e-f.

In the example shown in FIG. 9, the slave terminal 2c (terminal number 3) is not connected to the network, so that the cell corresponding to the terminal number 3 in each column is still in the initial condition. When it is determined that the partner slave terminal does not exist, the cell corresponding to the terminal number in each column is reset to the initial condition.

As described above, in the synchronization control system according to Embodiment 3 of the present invention, the existence state, synchronization control state, and address of the slave terminal 2 are managed and stored, and the sending/receiving processor 11c can access and use such information when generating each packet for synchronization control. Thus, the sending/receiving processor 11c can perform centralized management of member information regarding a plurality of slave terminals by using the slave terminal numbers as key values.

Embodiment 4

Now, Embodiment 4 of the present invention is described. FIG. 10 is an explanatory diagram of the transmission interface 11a according to Embodiment 4 of the present invention. In Embodiment 4, in contrast with Embodiment 1 shown in FIG. 1, the transmission interface 11a has registers for acquiring a receiving timing for synchronization control calculation, and the address of the registers is an address common to the slave terminals 2a to 2n so that a single data packet receiving timing circuit is sufficient. In the example described in Embodiment 4, the master terminal 1 receives the synchronization request packets from the slave terminals 2a to 2n.

In Embodiment 4, the registers for acquiring receiving timings in the transmission interface 11a have an address common to all the slave terminals 2a to 2n.

In the example shown in FIG. 10, three addresses (0100, 0104, and 0108) exclusive to the acquisition of receiving timings are allocated to registers incorporated in the master terminal 1 and the slave terminals 2a to 2n. When each terminal receives a data packet, the data packet receiving timing circuit incorporated in the transmission interface 11a of each terminal is used to write the data packet into the registers, and the sending/receiving processor 11c reads the receiving timings from the registers.

Here, when the master terminal 1 receives a data packet from each of the slave terminals 2a to 2n, the receiving timing acquiring registers can be separated for the respective slave terminal numbers. However, when the number of slave terminals is four or more, there is a shortage of registers. When all the given three registers are used, such inefficient processing as to allocate which register to use in accordance with the terminal number is required.

Accordingly, in the example shown in FIG. 10, only the register of the receiving timing 1 located at the address 0100 is used, and the other two addresses are not used. The transmission interface 11a uses the common address to acquire a receiving timing.

As described above, in the synchronization control system according to Embodiment 4 of the present invention, the registers for acquiring the data packet receiving timings have an address common to all the slave terminals. Thus, the use of a single data packet receiving timing circuit is sufficient, and the synchronization control system can be obtained without the expansion of given hardware. It is also possible to avoid such inefficient processing as to allocate the use of the registers in accordance with the terminal numbers of a plurality of terminals.

Embodiment 5

Embodiment 5 of the present invention is described next. In Embodiment 5, in contrast with Embodiment 1 shown in FIG. 1, when the number of the slave terminals 2a to 2n connected to the network 4 is more than a given threshold, the sending/receiving processor 11c adds, to the synchronization request demanding packet as information, the number of a slave terminal from which to demand a synchronization request. Thus, the synchronization request demanding packet is multicast-sent. In the example described in Embodiment 5, sampling synchronization control is performed between the master terminal 1 and each of the slave terminals 2a to 2n when the number of the slave terminals connected to the network 4 is more than a given threshold.

In Embodiment 1 shown in FIG. 3, the synchronization request demanding packet is unicast-sent. On the other hand, in Embodiment 5, the sending/receiving processor 11c switches the sending destination address from a unicast address to a multicast address when the number n of the slave terminals 2a to 2n connected to the network 4 via the intermediary device 3 is more than a given threshold x. A plurality of demand recipient terminal numbers are specified for simultaneous synchronization control of the slave terminals 2a to 2n. When, in this condition, some of the slave terminals 2 are disconnected from the network 4 because of, for example, a power cut and the number of the slave terminals has become equal to or less than the threshold x, the sending destination address is again set back to the unicast address. The number of the slave terminals is found by reading the contents of the existence state column 11e-b of the terminal information manager 11e and counting the number of cells having contents that show "Yes".

FIG. 11 is an explanatory diagram of a data packet sent and received between the terminals according to Embodiment 5. As shown in FIG. 11, the data packet comprises, in order from the most significant bit, a sending destination address, a sending source address, a type which indicates the classification of an upper protocol, a sampling address which is a numerical value indicating a sampling timing, an outgoing data portion, and a frame check sequence code.

The outgoing data in the data packet includes information such as an electric amount, terminal numbers, and a packet classification for the identification of the kind of data packet. When the packet classification indicates a synchronization request demanding packet and the sending destination address indicates a multicast address, a demand recipient terminal number is also included in the outgoing data.

Figure 12:
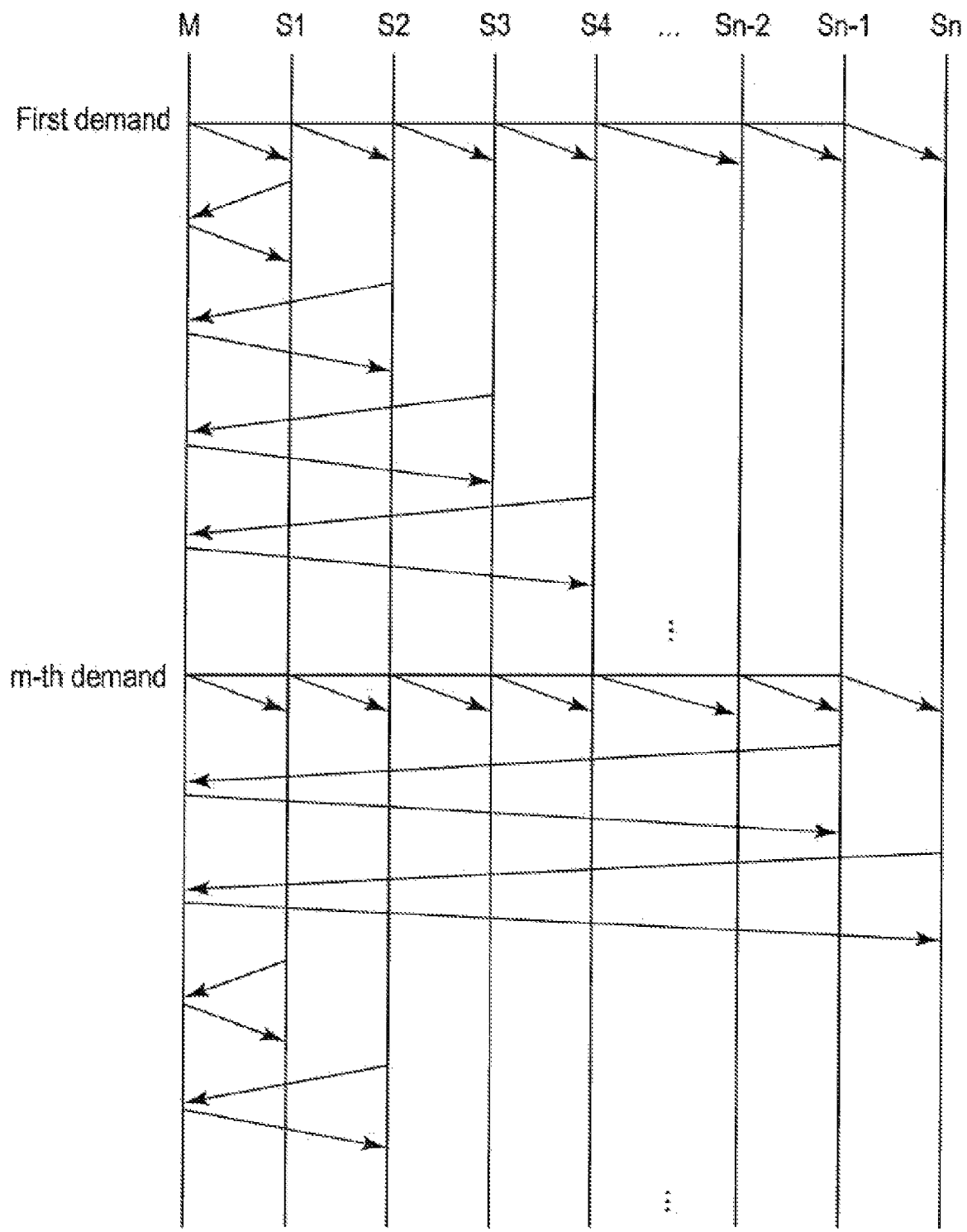
FIG. 12 is an explanatory diagram of a synchronization control sequence in the case of the multicast sending of the synchronization request demanding packet according to Embodiment 5 of the present invention.

FIG. 12 is an explanatory diagram of a synchronization control sequence in the case of the multicast sending of the synchronization request demanding packet according to Embodiment 5 of the present invention. In FIG. 12, M indicates a master terminal, and S1 to Sn indicate slave terminals. As shown in FIG. 12, in Embodiment 5, in addition to the synchronization sequence shown in FIG. 3, when the number n of the slave terminals is more than the given threshold x, a synchronization request demanding packet is multicast-sent. Each of the slave terminals S1 to Sn which have received the synchronization request demanding packet analyzes the contents of the packet. When a terminal is targeted for the demand for the synchronization request, this terminal sends a synchronization request packet.

In the example shown in FIG. 12, four terminals are sequentially specified by synchronization request demand recipient terminal numbers; for example, 1 to 4 for the first sending of synchronization request demanding packet, n−1 to n and 1 to 2 for the m-th sending, and 3 to 6 for the m−1-th sending. According to FIG. 12, the slave terminals S1 to 4 send synchronization request packets for the first sending of the synchronization request demanding packet, and the slave terminals Sn−1, Sn, S1, and S2 send synchronization request packets for the m-th sending.

Here, the sending/receiving processors 11c of the slave terminals S1 to Sn perform control so that the synchronization request packets are sent by different timings on the basis of the values of sampling addresses shown in FIG. 11. For example, the sending/receiving processor 11c of each of the slave terminals S1 to Sn performs control so that the synchronization request packet is sent when the remainder left if the sampling address is divided by a given constant corresponds to the terminal number of this slave terminal. The master terminal M which has received each synchronization request packet sequentially sends a synchronization reply packet for each sampling timing.

FIG. 13 is an explanatory diagram of a table in the terminal information manager in the case of the multicast sending of the synchronization request demanding packet according to Embodiment 5 of the present invention. The example in FIG. 13 shows the state of the terminal information manager 11e immediately after the completion of the synchronization control sequence for the slave terminal S1 in which 1 to 4 are specified as the synchronization request demand recipient slave terminal numbers so that the synchronization request demanding packet is multicast-sent, and synchronization request packets are then received from the slave terminals 1 to 3.

Immediately after the synchronization request demanding packet is sent, the contents of the cells corresponding to the terminal numbers 2 to 4 of the synchronization control in-progress column 11e-c show "Yes". Synchronization request packets are then sequentially received from the slave terminals S1 to S3, and the contents of the cells corresponding to the terminal numbers 2 and 3 of the synchronization reply permission column 11e-d show "Yes". Simultaneously with the sending of a synchronization reply packet to the slave terminal S1, the sending/receiving processor 11c then determines that the synchronization control sequence for the slave terminal S1 has been completed, and the contents of the cells corresponding to the terminal number 1 in the synchronization control in-progress column 11e-c and the synchronization reply permission column 11e-d are returned to "No" from "Yes". As regards the slave terminal S4, the contents of the cell corresponding to the terminal number 4 in the synchronization reply permission column 11e-d show "No" because the master terminal M has received no synchronization request packet at this point.

As described above, in the synchronization control system according to Embodiment 5 of the present invention, when the number of the slave terminals connected to the network 4 is more than the given threshold, the sending destination of the synchronization request demanding packet is switched to a multicast address, and the outgoing data in the synchronization request demanding packet with a synchronization request demand recipient slave terminal number added thereto is sent. After each of the slave terminals S1 to Sn has received the synchronization request demanding packet, the sending/receiving processor 11c performs control so that synchronization request packets are sent by different timings without the synchronization of the synchronization request packets at the master terminal M. As a result, the synchronization control sequences can be simultaneously performed for a plurality of slave terminals.

Consequently, synchronization control is simultaneously performed so that the master terminal M is not synchronized with a plurality of slave terminals in the receipt of the synchronization request packets. Thus, synchronization control sequences can be performed at short intervals even in the case of synchronization control with a large number of slave terminals, and high-precision sampling synchronization is possible.

Embodiment 6

Embodiment 6 of the present invention is described next. In Embodiment 6, in contrast with Embodiment 5, when the number of the slave terminals 2 connected to the network 4 is less than the given threshold, the sending/receiving processor 11c multicast-sends a demand cancel command packet such that the slave terminals 2 send synchronization request packets without waiting for a synchronization request demanding packet to be received from the master terminal 1. When the number of the slave terminals 2 connected to the network 4 has reached the given threshold, a demand start command packet is sent such that the slave terminals 2 send synchronization request packets after waiting for a synchronization request demanding packet to be received from the master terminal 1.

In the example described in Embodiment 6, sampling synchronization control is performed between the master terminal 1 and each of the slave terminals 2 when the number of the slave terminals is less than a given threshold y because some of the slave terminals 2 connected to the network 4 are disconnected from the network 4 due to, for example, equipment maintenance or a power cut, or when some slave terminals 2 are connected to the network 4 and the number of the slave terminals has reached the threshold y.

FIG. 14 is an explanatory diagram of an example of a synchronization control sequence in which the master terminal sends the demand cancel command packet according to Embodiment 6 of the present invention. In FIG. 14, M indicates a master terminal, S1 to Sn indicate slave terminals, demand indicates a synchronization request demanding packet, request indicates a synchronization request packet, reply indicates a synchronization reply packet, and demand cancel command indicates a demand cancel command packet.

In the example shown in FIG. 14, the master terminal M performs synchronization control with four slave terminals S1 to S4, and the threshold in this case is set to y=4. Here, synchronization control sequences for the slave terminal S1 and the slave terminal S2 are completed, and a synchronization request demanding packet is then sent to the slave terminal S3.

In the example shown in FIG. 14, no synchronization request packet is received from the slave terminal S3 for a given period of time because the slave terminal S3 is disconnected from the network 4 due to, for example, equipment maintenance. Therefore, a synchronization request demanding packet is unsuccessfully sent. A total of three synchronization request demanding packets are then unsuccessfully sent to the slave terminal S3 again. As the time-out count is three or more, it is thus determined by the processing in FIG. 4 that the slave terminal S3 does not exist, and the contents of each column corresponding to the terminal number 3 in the terminal information manager 11e is reset to the initial condition.

As a result, the number of the slave terminals connected to the network 4 is three, which is less than the given threshold y=4. The sending/receiving processor 11c of the master terminal M reads and determines the contents of the terminal information manager 11e, and multicast-sends a demand cancel command packet. The demand cancel command packet is a packet which commands the sending/receiving processor 11c of each of the slave terminals S1 to S4 to send a synchronization request packet by its timing without waiting for a synchronization request demanding packet to be received from the master terminal M.

The sending/receiving processors 11c of the slave terminals S1, S2, and S4 which have received the demand cancel command packet switch processing so that the respective terminals send synchronization request packets by different sampling timings without waiting for the receipt of the synchronization request demanding packet and without the synchronization of the receipt of the synchronization request packets at the master terminal M.

As an example of a sending timing control method, a slave terminal sends a synchronization request packet when the remainder left if the sampling address is divided by a given constant corresponds to the terminal number of this slave terminal, as in Embodiment 5. Accordingly, each of the slave terminals S1, S2, and S4 sends synchronization request packets by its sampling timing after the receipt of the synchronization request demanding packet.

FIG. 15 is an explanatory diagram of another example of the synchronization control sequence in which the master terminal sends the demand cancel command packet according to Embodiment 6 of the present invention. In FIG. 15, M indicates a master terminal, S1 to Sn indicate slave terminals, demand indicates a synchronization request demanding packet, request indicates a synchronization request packet, reply indicates a synchronization reply packet, existence indicates an existence report packet, and demand start command indicates a demand start command packet.

In the example shown in FIG. 15, while the slave terminal S3 is disconnected from the network 4 among the four slave terminals S1 to S4, each of the other three slave terminals S1, S2, and S4 sends a synchronization request packet by its sending timing. After a certain time, the slave terminal S3 is connected to the network 4 because of, for example, the completion of equipment maintenance, and the slave terminal S3 sends an existence report packet to the master terminal M.

As a result, the sending/receiving processors 11c of the master terminal M which has received the existence report packet determines that the number of the slave terminals has reached the threshold y=4. The sending/receiving processors 11c then multicast-send, to each of the slave terminals S1 to S4, a demand start command packet which commands each of the slave terminals S1 to S4 to send a synchronization request packet after waiting for a synchronization request demanding packet to be received from the master terminal M. Each of the slave terminals S1 to S4 which have received the demand start command packet switches processing to send a synchronization request packet after waiting for a synchronization request demanding packet to be received from the master terminal M. A synchronization sequence similar to that shown in FIG. 3 is then sequentially performed for each of the slave terminals S1 to S4.

Now, the transition of the synchronization control system in the case of the varying number of slave terminals according to Embodiment 6 of the present invention is described. FIG. 16 is an explanatory diagram of the transition of the synchronization control system according to Embodiment 6 of the present invention.

In the example shown in FIG. 16, each slave terminal sends a synchronization request packet without waiting for a synchronization request demanding packet from the master terminal in the initial condition. The slave terminals are connected to the network 4 one by one. The number of the slave terminals reaches y at an elapsed time t1. The master terminal sends a demand start command packet to each slave terminal. Each terminal switches processing so that the synchronization control sequence shown in FIG. 3 will be performed.

After that, the number of the slave terminals connected to the network 4 increases further. The number of the slave terminals exceeds x at an elapsed time t2. At this stage, the master terminal changes the synchronization request demanding packet to multicast sending, and performs synchronization control sequences with a plurality of slave terminals. After a certain time, an unspecified number of slave terminals are disconnected from the network 4 because of, for example, a network failure, and the number of slave terminals gradually decreases. The number of slave terminals decreases to x at an elapsed time t3. At this stage, the master terminal changes the synchronization request demanding packet to unicast sending from the multicast sending.

After that, the number of the slave terminals connected to the network 4 decreases further. The number of the slave terminals is less than y at an elapsed time t4. At this stage, the master terminal sends a demand cancel command packet to instruct each slave terminal to send a synchronization request packet without waiting for a synchronization request demanding packet from the master terminal. After that, a plurality of slave terminals which have been disconnected from the network 4 are connected to the network 4 one after another because of, for example, recovery from the network failure. The number of the slave terminals reaches y at an elapsed time t5, and the master terminal sends a demand start command packet to each slave terminal. Transition of the synchronization control system is then similarly performed in accordance with the number of the slave terminals.

As described above, in the synchronization control system according to Embodiment 6 of the present invention, when the number of the slave terminals connected to the network 4 is less than a given threshold, a demand cancel command packet is multicast-sent to each slave terminal to instruct each slave terminal to send a synchronization request packet by its sending timing without waiting for the receipt of the synchronization request demanding packet. Thus, when the slave terminals less than a given number are connected to the network, it is possible to perform synchronization control without waiting for the completion of a series of synchronization control sequences in the other slave terminals.

Contrarily, when the number of the slave terminals has reached the threshold, a demand start command packet is multicast-sent to each slave terminal to instruct each slave terminal to send a synchronization request packet after waiting for the receipt of the synchronization request demanding packet. Consequently, synchronization control processing optimum for the number of the slave terminals can be performed, and high-precision sampling synchronization control is possible regardless of the number of terminals.

Embodiment 7

Embodiment 7 of the present invention is described. In Embodiment 7, in contrast with Embodiment 2, the transmission processor of the slave terminal is provided with the terminal information manager 11e. The transmission processor of the master terminal multicast-sends an existence report packet in the same way as the transmission processor of the slave terminal. When no existence report packet is received from the transmission processor of the master terminal for a given period of time, the slave terminal having the lowest number is used as a proxy master. The proxy master sends synchronization request demanding packets to the other slave terminals, and uses the terminal information manager to manage information regarding the other slave terminals and the state of synchronization control.

Described in the example according to Embodiment 7 is processing and information management performed at the slave terminal when the master terminal is disconnected from the network because of, for example, equipment maintenance or a network failure and when the connection of the master terminal is recovered.

In Embodiment 7, not only the master terminal 1 but also each of the slave terminals 2a to 2n comprises the terminal information manager 11e so that a certain slave terminal 2 serves as a proxy master terminal and can manage information regarding the other slave terminals 2 when no data packet is sent from the master terminal 1. When the connection of the master terminal 1 to the network is recovered, the synchronization band ΔT occurs between the master terminal 1 and each of the slave terminals 2a to 2n. Therefore, the proxy master terminal performs a synchronization control sequence for the master terminal 1. Thus, each of the slave terminals 2a to 2n also manages information regarding the master terminal 1.

FIG. 17 is an explanatory diagram of a table in the terminal information manager in the case of multicast sending of a synchronization request demanding packet according to Embodiment 7 of the present invention. In the example shown in FIG. 17, the table of the terminal information manager 11e has a cell corresponding to the master terminal 1 in each column so that the terminal number of the master terminal is "0". In this case, the master terminal 1 is connected to the network 4, and the existence state shows "Yes".

In Embodiment 7, the master terminal 1 also sends an existence report packet in the same way as the slave terminals 2a to 2n and multicast-sends the existence report packet so that all the terminals can recognize the existence state one another.

FIG. 18 is an explanatory diagram of a synchronization control sequence in which the master terminal is disconnected from the network according to Embodiment 7 of the present invention. In FIG. 18, M indicates a master terminal, S1 to Sn indicate slave terminals, demand indicates a synchronization request demanding packet, request indicates a synchronization request packet, reply indicates a synchronization reply packet, and existence indicates an existence report packet.

As shown in FIG. 18, the master terminal M multicast-sends the existence report packet to the slave terminals S1 to Sn. Each of the slave terminals S1 to Sn also manages the existence state of each terminal by using the terminal information manager 11e. After a certain time, the existence report packet is unsuccessfully sent because the master terminal M is disconnected from the network 4 because of, for example, an equipment problem or a failure in the network 4.

After that, unsuccessful sending is repeated. After the m-th unsuccessful sending, the sending/receiving processor 11c of each of the slave terminals S1 to Sn determines by using, for example, an internal timer counter that the master terminal does not exist because no existence report packet is received from the master terminal M for a given period of time. The sending/receiving processor 11c resets information in all the cells corresponding to the master terminal M in the terminal information manager 11e to the initial condition.

The sending/receiving processor 11c of each of the slave terminals S1 to Sn determines by reading information in the terminal information manager 11e whether this terminal has the lowest terminal number among the existing slave terminals S1 to Sn. The slave terminal S1 which has been determined to have the lowest terminal number switches processing as a proxy master terminal, and sequentially sends synchronization request demanding packets to the rest of the slave terminals.

In the example shown in FIG. 18, the slave terminal S1 is the proxy master terminal. From this point, the slave terminal S1 which is the proxy master terminal uses the terminal information manager 11e to manage the existence state of each of the slave terminals S1 to Sn, the slave terminal currently under synchronization control, the acceptance of a synchronization reply, the number of time-outs, and addresses. The proxy master terminal is then also disconnected from the network 4. When the rest of the slave terminals determine that the proxy master terminal does not exist, the slave terminal having the second lowest terminal number similarly functions as a proxy master terminal.

FIG. 19 is an explanatory diagram of a synchronization control sequence in which the master terminal disconnected from the network is reconnected to the network according to Embodiment 7 of the present invention. In FIG. 19, M indicates a master terminal, S1 to Sn indicate slave terminals, demand indicates a synchronization request demanding packet, request indicates a synchronization request packet, reply indicates a synchronization reply packet, existence indicates an existence report packet, and demand cancel command indicates a demand cancel command packet.

As shown in FIG. 19, the slave terminal S1 continues to function as the proxy master terminal, and performs synchronization control sequences for the other slave terminals S2 to Sn. After a certain time, each of the slave terminals S1 to Sn receives an existence report from the original master terminal M, and ascertains that the original master terminal M is connected to the network 4. As shown in FIG. 17, the sending/receiving processor 11*c* sets the contents of the cell corresponding to the master terminal (terminal number 0) of the existence state column 11*e-b* of the terminal information manager 11*e* to "Yes".

Here, the synchronization band ΔT between the slave terminal S1 which is the proxy master terminal and the original master terminal M needs to be eliminated before the slave terminal S1 switches to the processing as a slave terminal. Therefore, a demand start command packet for demanding synchronization control is unicast-sent to the master terminal M. The sending/receiving processor 11*c* of the master terminal which has received the demand start command packet temporarily switches to the processing as a slave terminal. The slave terminal S1 which is the proxy master terminal then sends a synchronization request demanding packet to the master terminal M, and performs a synchronization control sequence in the same way as the other slave terminals for a certain time.

When the margin of the synchronization band ΔT of the master terminal M is determined to be "uncorrected" by the processing in FIG. 6, the master terminal M sends a synchronization completion report packet for reporting the completion of sampling synchronization to the slave terminal S1 which is the proxy master terminal. Immediately after this, the sending/receiving processor 11*c* of the master terminal M switches to the processing as the master terminal M. The sending/receiving processor 11*c* of the slave terminal S1 which has received the synchronization completion report packet switches to the processing as the original slave terminal, and sends a synchronization request packet after waiting for a synchronization request demanding packet to be received from the master terminal M. After that, the original master terminal M sequentially performs synchronization control sequences for the slave terminals S1 to Sn, as in Embodiments 1 and 2.

As described above, in the synchronization control system according to Embodiment 7 of the present invention, all the terminals multicast-send existence report packets so that when the master terminal M is disconnected from the network 4 because of some trouble or equipment maintenance, another slave terminal can function as a proxy master terminal. Moreover, not only the master terminal M but also the slave terminals S1 to Sn manage information regarding the terminals.

The standard for determining a proxy master terminal is the slave terminal having the lowest terminal number. Each slave terminal uses, for example, the internal timer counter to measure the duration of the receipt of no existence report packet from the master terminal, thereby determining the existence state. The slave terminal which serves as the proxy master terminal sequentially sends synchronization request demanding packets to other slave terminals. When an existence report packet is received from the original master terminal, the slave terminal which is the proxy master terminal performs a synchronization control sequence for the master terminal. The slave terminal as the proxy master terminal switches to the processing as the original slave terminal after ascertaining that the synchronization band between the master terminal and this slave terminal has been eliminated.

Consequently, synchronization control can be stably performed without the disturbance of the synchronization state even if the master terminal or the proxy master terminal is disconnected from the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A synchronization control system which respectively comprises transmission processors in a master terminal connected to a network and in a plurality of slave terminals and which synchronizes the slave terminals with the master terminal, wherein the transmission processor of the master terminal comprises:
a transmission interface which holds a data packet to be sent or received and which acquires a receiving timing for synchronization control calculation when receiving a packet for synchronization control,
a timing generator which generates a constant internal timing,
a sending/receiving processor which sends a synchronization request demanding packet to a particular slave terminal and sends a synchronization reply packet when receiving a synchronization request packet from the slave terminal that has received the synchronization request demanding packet, and
a synchronization controller which calculates a synchronization band from the time of the receipt of the data packet and from time information added to the received data packet to determine a synchronization state and which adjusts a correction amount in accordance with the synchronization state and sends an internal timing correction command to the timing generator.

2. The synchronization control system according to claim 1, wherein the transmission processor of each of the slave terminals comprises a function of sending to the transmission processor of the master terminal in a long period an existence report packet to report that each of the slave terminals is connected to the network.

3. The synchronization control system according to claim 2, wherein the transmission processor of each of the slave terminals comprises a terminal information manager which stores a table to manage information regarding each of the slave terminals and the state of synchronization control, and the transmission processor of the master terminal multicast-sends an existence report packet in the same way as the transmission processor of each of the slave terminals, and when no existence report packet is received from the transmission processor of the master terminal for a given period of time, the slave terminal having the lowest terminal number serves as a proxy master, and the proxy master sends synchronization request demanding packets to the other slave terminals and uses the terminal information manager to manage the information regarding each of the slave terminals and the state of synchronization control.

4. The synchronization control system according to claim 1, wherein the transmission processor of the master terminal comprises a terminal information manager which stores a table to manage information regarding each of the slave terminals and the state of synchronization control.

5. The synchronization control system according to claim 1, wherein the transmission interface comprises a register to acquire the receiving timing for synchronization control calculation, an address of the register is common to the slave terminals, and a single data packet receiving timing circuit is used.

6. The synchronization control system according to claim 1, wherein when the number of the slave terminals connected to the network is more than a given threshold, the sending/receiving processor adds, to the synchronization request demanding packet as information, the number of a slave terminal from which to demand a synchronization request, and multicast-sends the synchronization request demanding packet.

7. The synchronization control system according to claim 6, wherein the sending/receiving processor multicast-sends a demand cancel command packet for the slave terminal to send a synchronization request packet without waiting for a synchronization request demanding packet to be received from the master terminal when the number of the slave terminals connected to the network is less than the given threshold, and the sending/receiving processor sends a demand start command packet for the slave terminal to send a synchronization request packet after waiting for a synchronization request demanding packet to be received from the master terminal when the number of the slave terminals connected to the network has reached the given threshold.

8. A master terminal which is applied to a synchronization control system, the synchronization control system respectively comprising transmission processors in the master terminal connected to a network and in a plurality of slave terminals and synchronizing the slave terminals with the master terminal, wherein
the transmission processor of the master terminal comprises:
a transmission interface which holds a data packet to be sent or received and which acquires a receiving timing for synchronization control calculation when receiving a packet for synchronization control,
a timing generator which generates a constant internal timing,
a sending/receiving processor which sends a synchronization request demanding packet to a particular slave terminal and sends a synchronization reply packet when receiving a synchronization request packet from the slave terminal that has received the synchronization request demanding packet, and
a synchronization controller which calculates a synchronization band from the time of the receipt of the data packet and from time information added to the received data packet to determine a synchronization state and which adjusts a correction amount in accordance with the synchronization state and sends an internal timing correction command to the timing generator.

9. The master terminal according to claim 8, wherein the transmission processor of the master terminal comprises a terminal information manager which stores a table to manage information regarding each of the slave terminals and the state of synchronization control.

10. The master terminal according to claim 8, wherein the transmission interface comprises a register to acquire the receiving timing for synchronization control calculation, an address of the register is common to the slave terminals, and a single data packet receiving timing circuit is used.

11. The master terminal according to claim 8, wherein when the number of the slave terminals connected to the network is more than a given threshold, the sending/receiving processor adds, to the synchronization request demanding packet as information, the number of a slave terminal from which to demand a synchronization request, and multicast-sends the synchronization request demanding packet.

12. The master terminal according to claim 11, wherein the sending/receiving processor multicast-sends a demand cancel command packet for the slave terminal to send a synchronization request packet without waiting for a synchronization request demanding packet to be received from the master terminal when the number of the slave terminals connected to the network is less than the given threshold, and the sending/receiving processor sends a demand start command packet for the slave terminal to send a synchronization request packet after waiting for a synchronization request demanding packet to be received from the master terminal when the number of the slave terminals connected to the network has reached the given threshold.

* * * * *